US007831685B2

(12) United States Patent
Dai et al.

(10) Patent No.: US 7,831,685 B2
(45) Date of Patent: Nov. 9, 2010

(54) AUTOMATIC DETECTION OF ONLINE COMMERCIAL INTENTION

(75) Inventors: Honghua Dai, Sammamish, WA (US); Lee Wang, Kirkland, WA (US); Ying Li, Bellevue, WA (US); Zaiqing Nie, Haidian District (CN); Ji-Rong Wen, Haidian District (CN); Lingzhi Zhao, Haidian District (CN)

(73) Assignee: Microsoft Corporation, Redmond, WA (US)

( * ) Notice: Subject to any disclaimer, the term of this patent is extended or adjusted under 35 U.S.C. 154(b) by 867 days.

(21) Appl. No.: 11/300,748

(22) Filed: Dec. 14, 2005

(65) Prior Publication Data

US 2007/0136457 A1 Jun. 14, 2007

(51) Int. Cl.
*G06F 15/16* (2006.01)
*G06Q 30/00* (2006.01)

(52) U.S. Cl. .......................................... 709/217; 705/26
(58) Field of Classification Search .................... 705/26, 705/1, 14, 80, 53, 51, 7, 57, 28; 707/3, E17.11, 707/5, 100, 104.1; 709/217, 224
See application file for complete search history.

(56) References Cited

U.S. PATENT DOCUMENTS

| | | | |
|---|---|---|---|
| 6,085,186 A * | 7/2000 | Christianson et al. ............... 1/1 |
| 6,654,735 B1 | 11/2003 | Eichstaedt et al. | |
| 6,868,389 B1 | 3/2005 | Wilkins et al. | |
| 6,904,408 B1 * | 6/2005 | McCarthy et al. ............... 705/2 |
| 7,117,207 B1 * | 10/2006 | Kerschberg et al. ................. 1/1 |
| 7,158,986 B1 * | 1/2007 | Oliver et al. ....................... 1/1 |
| 2001/0011235 A1 | 8/2001 | Kim et al. | |
| 2001/0053998 A1 | 12/2001 | Kohda et al. | |
| 2003/0023511 A1 | 1/2003 | Gardner, Sr. | |
| 2003/0028498 A1 * | 2/2003 | Hayes-Roth ................. 706/17 |

(Continued)

FOREIGN PATENT DOCUMENTS

EP    1517250 A1    3/2005

(Continued)

OTHER PUBLICATIONS

International Search Report, dated Mar. 27, 2007, mailed Mar. 27, 2007, for International Application No. PCT/US2006/043944, 4 pages.

(Continued)

*Primary Examiner*—Benjamin R Bruckart
*Assistant Examiner*—Saad A Waqas
(74) *Attorney, Agent, or Firm*—Shook, Hardy & Bacon LLP

(57) ABSTRACT

Features extracted from network browser pages and/or network search queries are leveraged to facilitate in detecting a user's browsing and/or searching intent. Machine learning classifiers constructed from these features automatically detect a user's online commercial intention (OCI). A user's intention can be commercial or non-commercial, with commercial intentions being informational or transactional. In one instance, an OCI ranking mechanism is employed with a search engine to facilitate in providing search results that are ranked according to a user's intention. This also provides a means to match purchasing advertisements with potential customers who are more than likely ready to make a purchase (transactional stage). Additionally, informational advertisements can be matched to users who are researching a potential purchase (informational stage).

11 Claims, 19 Drawing Sheets

U.S. PATENT DOCUMENTS

| | | |
|---|---|---|
| 2003/0093338 A1 | 5/2003 | Kim et al. |
| 2003/0105589 A1* | 6/2003 | Liu et al. .................. 702/1 |
| 2003/0229629 A1 | 12/2003 | Jasinschi et al. |
| 2004/0138943 A1 | 7/2004 | Silvernail |
| 2004/0225553 A1 | 11/2004 | Broady et al. |
| 2005/0144084 A1 | 6/2005 | Gold et al. |
| 2006/0064411 A1* | 3/2006 | Gross et al. .................. 707/3 |
| 2006/0069618 A1* | 3/2006 | Milener et al. .............. 705/14 |
| 2009/0254971 A1* | 10/2009 | Herz et al. .................. 726/1 |

FOREIGN PATENT DOCUMENTS

| | | |
|---|---|---|
| WO | 9901826 A2 | 1/1999 |

OTHER PUBLICATIONS

Google AdSense for content: Enhance your site—and your profits. https://www.google.com/adsense/afc-online-overview, Sep. 1, 2005.

Google AdWords https://adwords.google.com/select/main?cmd=Login, Sep. 1, 2005.

Performics Search http://www.doubleclick.com/us/products/digital_advertising/performics_search/default.asp, Sep. 1, 2005.

IP Intelligence http://www.digitalenvoy.net/index_only/Ip_intelligence.html, Sep. 1, 2005.

* cited by examiner

AUTOMATIC DETECTION OF ONLINE COMMERCIAL INTENTION

BACKGROUND

Modern society has come to depend heavily on computers and computer technology. It is especially prevalent in the business arena where companies compete fiercely for customers and product sales. A company with just-in-time inventory and well focused advertising strategies generally produces a product cheaper and delivers it faster to a customer than a competitor. Computer technology makes this type of business edge possible by networking businesses, information, and customers together. Although originally computers communicated to other computers via networks that only consisted of local area networks (LANs), the advent of the Internet has allowed virtually everyone with a computer to participate in a global network. This allows small businesses to be competitive with larger businesses without having to finance and build a network structure.

As computing and networking technologies become more robust, secure and reliable, more consumers, wholesalers, retailers, entrepreneurs, educational institutions and the like are shifting paradigms and employing the Internet to perform business instead of using traditional brick and mortar stores. Many businesses are now providing web sites and on-line services. For example, today a consumer can access their bank accounts via the Internet and perform a growing number of available transactions such as balance inquiries, funds transfers, and bill payment.

Moreover, electronic commerce has pervaded almost every conceivable type of business. People have come to expect that their favorite stores not only have brick and mortar business locations, but that they can also be accessed "online," typically via the Internet's World Wide Web (WWW). The Web allows customers to view graphical representations of a business' store and products. Ease of use from the home and convenient purchasing methods, typically lead to increased sales. Buyers enjoy the freedom of being able to comparison shop without spending time and money to drive from store to store.

This leads to a fierce competition between online businesses and makes online advertising paramount. Advertising, in general, is a key revenue source in just about any commercial market or setting. To reach as many consumers as possible, advertisements are traditionally presented via billboards, television, radio, and print media such as newspapers and magazines. However, with the Internet, advertisers have found a new and perhaps less expensive medium for reaching vast numbers of potential customers across a large and diverse geographic span. Advertisements on the Internet may be seen through any content rendered by a browser and/or other client device capable of rendering Internet content. This can include email, game consoles, video-on-demand via TV, web pages, and/or web sites as well as pop-up windows when a particular site is visited and the like.

Thus, global communication networks, such as the Internet, have presented commercial opportunities for reaching vast numbers of potential customers. In the past several years, large amounts of users have turned to the Internet as a reliable source of news, research resources, and various other types of information. In addition, online shopping, making dinner reservations, and buying concert and/or movie tickets are just a few of the common activities currently conducted while sitting in front of a computer by way of the Internet. The proliferation of easy access to the Internet has also facilitated to exponentially grow the traffic to web sites.

Typically, businesses like to be assured that the cost of advertising is justified by some type of guarantee as to the type of traffic that will be exposed to their advertisements. If advertisers believe that they are reaching users who are ready to purchase (i.e., users in a commercial "transactional stage") but, in reality, the majority of the users are only researching a particular type of product (i.e., users in a commercial "informational stage") or, even worse, they are simply browsing the Web for pleasure (i.e., users in a non-commercial stage), the business will be extremely unsatisfied to have paid top dollar for an advertisement that was supposedly directed at actual potential purchasers of their product type. Users who receive undesired advertisements may also form a negative image of a business that constantly bombards them with advertisements when they are not looking to purchase anything. This is important to note because matching products with buyers is generally how a business stays in business. When substantial mismatching occurs, advertisers move along and take their dollars with them, causing lost advertising revenue.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

The subject matter relates generally to network searching and/or browsing, and more particularly to systems and methods for determining a user's network searching and/or browsing intention. Features extracted from network browser pages and/or network search queries are leveraged to facilitate in detecting a user's browsing and/or searching intent. Machine learning classifiers constructed from these features automatically detect a user's online commercial intention (OCI). A user's intention can be commercial or non-commercial, with commercial intentions being informational or transactional.

In one instance, an OCI ranking mechanism is employed with a search engine to facilitate in providing search results that are ranked according to a user's intention. This also provides a means to match purchasing advertisements with potential customers who are more than likely ready to make a purchase (transactional stage). Additionally, informational advertisements can be matched to users who are researching a potential purchase (informational stage). Thus, instances can be employed in advertising bidding methods and systems to provide increased performance and revenue.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

Figure 1:
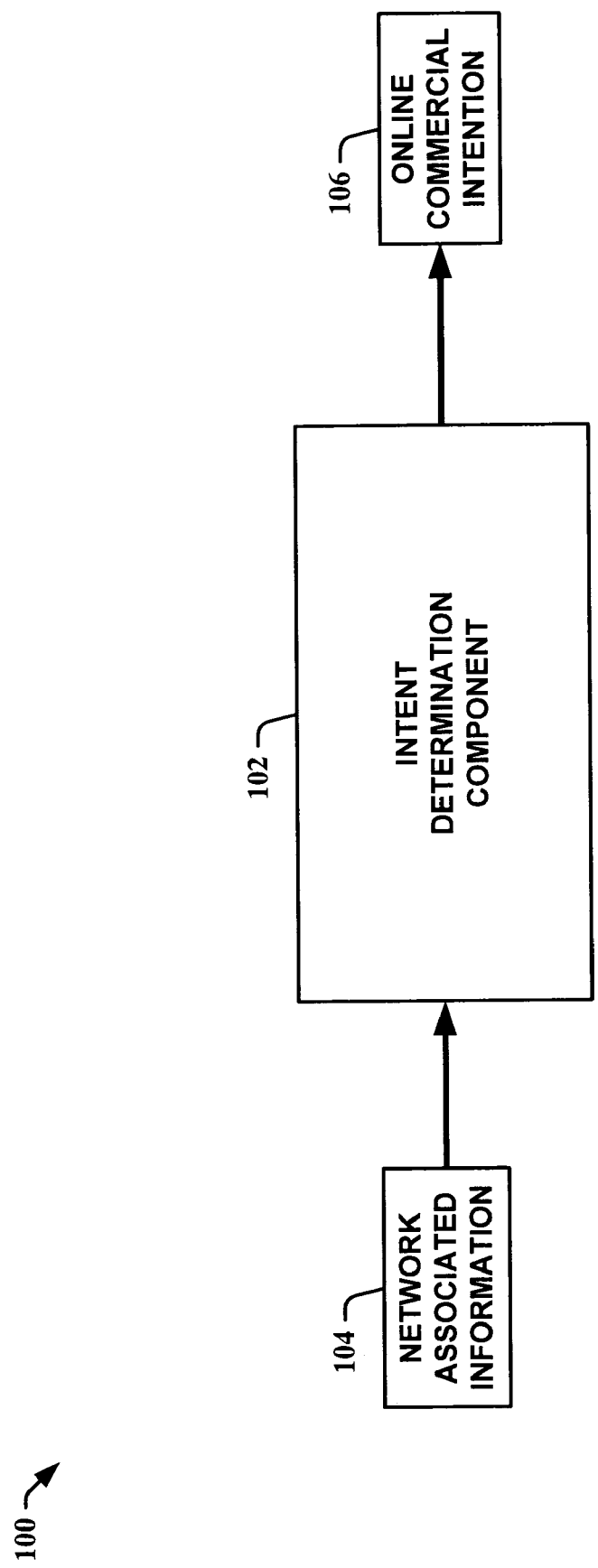
FIG. 1 is a block diagram of an intent determination system in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers.

Online users have different information needs depending on whether they are seeking information from the Internet or deciding on a brand and a product/service to purchase. Serving the right advertisements for a purchase stage can dramatically increase the efficiency of an advertisement campaign. For example, when a user is still at the informational stage, the advertiser would be better suited to provide more selections of the user's desired product and an incentive for the user to come back to the site. On the other hand, when the user is already at the transactional stage, it would be best for the advertisers to display detailed price, features, and/or discount information and the like about a specific product instead of a crowded list of many products.

Instances of the systems and methods herein detect different degrees of a user's purchase intention. That is, whether or not the user is in the process of purchasing, and if they are, how strongly the user wants to purchase. In one instance, web pages (i.e., network browsing information) are first classified into one of three types of online commercial classifications. Next, search queries are classified into one of three types of online commercial classifications. The appropriate type of advertisement can then be provided given the user's search query. In this manner, a substantially more efficient means of delivering appropriate advertisements is provided.

In FIG. 1, a block diagram of an intent determination system 100 in accordance with an aspect of an embodiment is shown. The intent determination system 100 is comprised of an intent determination component 102 that receives network associated information 104 and provides online commercial intention (OCI) 106. The intent determination component 102 generally incorporates machine learning algorithms trained utilizing extracted features and/or content of network associated training information. Labels can also be utilized to facilitate the training. These labels can be provided by organic-based (e.g., a user visually determines OCI type, etc.) means and/or by machine-based means (e.g., a machine learning mechanism, etc.).

Once training has been performed, the intent determination component 102 extracts features and/or content of the network associated information 104 that are determinative of online commercial intention 106. These features and/or content are then utilized to determine a type of OCI such as, for example, non-commercial, informational, or transactional which is then output as online commercial intention 106. The intent determination system 100 can be employed with search engines to facilitate in OCI-driven ranking systems, advertisement OCI-ranking systems, and/or other intent-based systems and the like. Although it 100 typically can be employed with systems that desire to find perspective buyers of merchandise and/or services, it 100 can also be employed in systems that desire to find users without commercial intent.

The intent determination system 100 can be seamlessly integrated into systems such that it can display intent in substantially real time. For example, a search web page can include a user intent indicator in proximity of a search keyword entry point. Data sources that can be employed to facilitate in determining intent can include, but are not limited to, search logs, snippets, sponsored links, click logs, and/or advertisement click logs and the like.

The network associated information 104 can include, but is not limited to, network browsing information and/or search information and the like. The intent determination system 100 can be employed with local networks such as intranets and the like and/or global networks such as the Internet and the like. Thus, the network browsing information can include, but is not limited to, Internet and/or intranet web pages, universal resource locators (URLs), and/or statistical browsing data and the like. The search information can include, but is not limited to, search keywords and/or phrases and/or statistical search data and the like.

Figure 2:
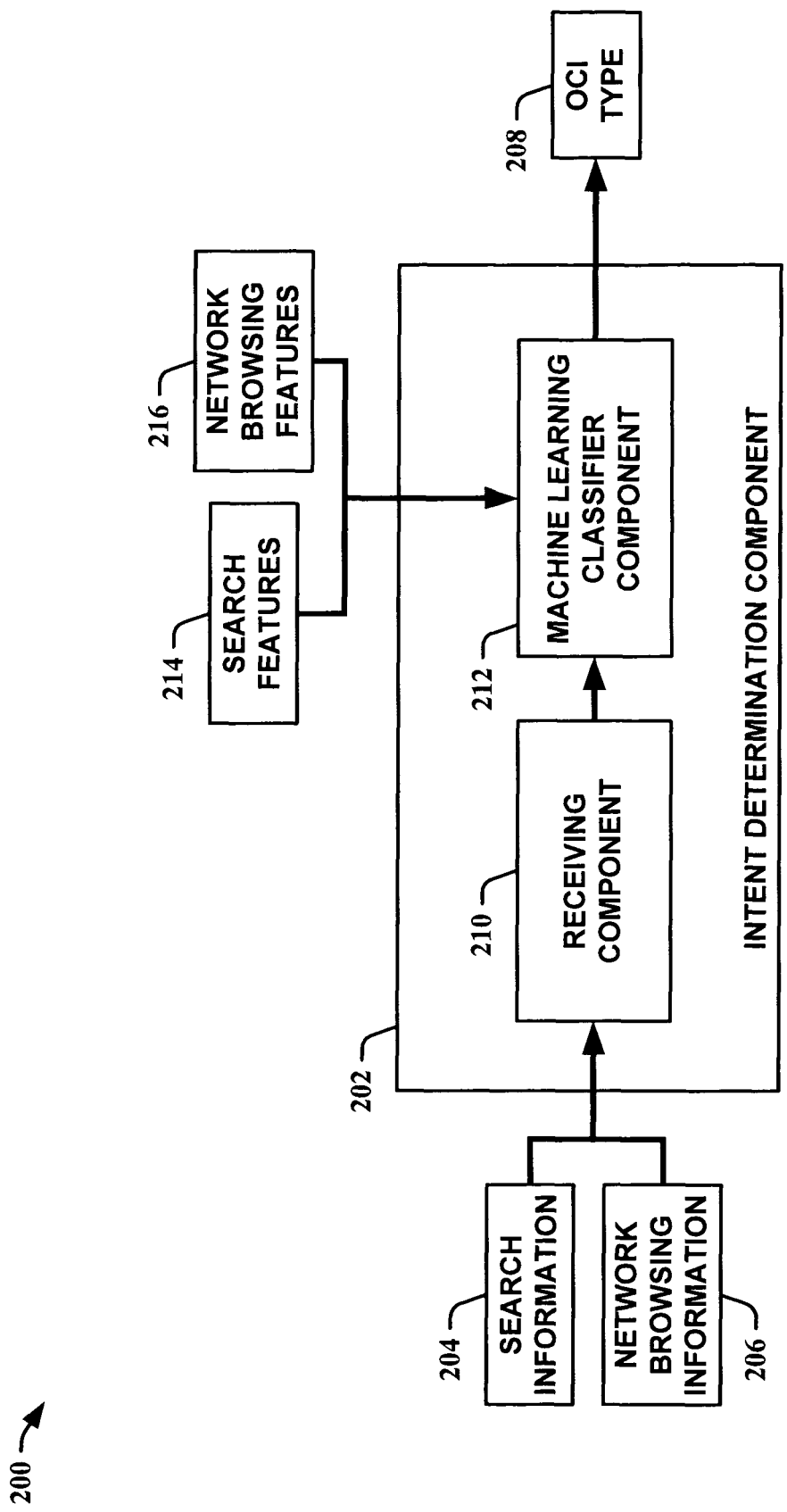
FIG. 2 is another block diagram of an intent determination system in accordance with an aspect of an embodiment.

Looking at FIG. 2, another block diagram of an intent determination system 200 in accordance with an aspect of an embodiment is depicted. The intent determination system 200 is comprised of an intent determination component 202 that obtains search information 204 and/or network browsing information 206 and provides OCI type 208. The intent determination component 202 is comprised of a receiving component 210 and a machine learning classifier component 212. The receiving component 210 obtains the search information 204 and/or the network browsing information 206 from, for example, an intranet and/or an Internet source and the like. The search information 204 and/or the network browsing information 206 represent information that is to be classified with regard to intent. Thus, the receiving component 210 relays the obtained information 204 and/or 206 to the machine learning classifier component 212.

The machine learning classifier component 212 utilizes an intent model and machine learning algorithms to facilitate in classifying the search information 204 and/or the network browsing information 206. One instance employs a Support Vector Machine (SVM) for this purpose. The intent model is trained utilizing search features 214 and/or network browsing features 216 and the like. As discussed in more detail infra, features (including search keywords and the like) can be labeled and/or extracted such that they facilitate in creating a model that can determine intent based on these differentiating features and the like. Thus, the machine learning classifier component 212 processes the search information 204 and/or the network browsing information 206 and provides the online commercial intention (OCI) type 208 (e.g., non-commercial, informational, transactional).

Figure 3:
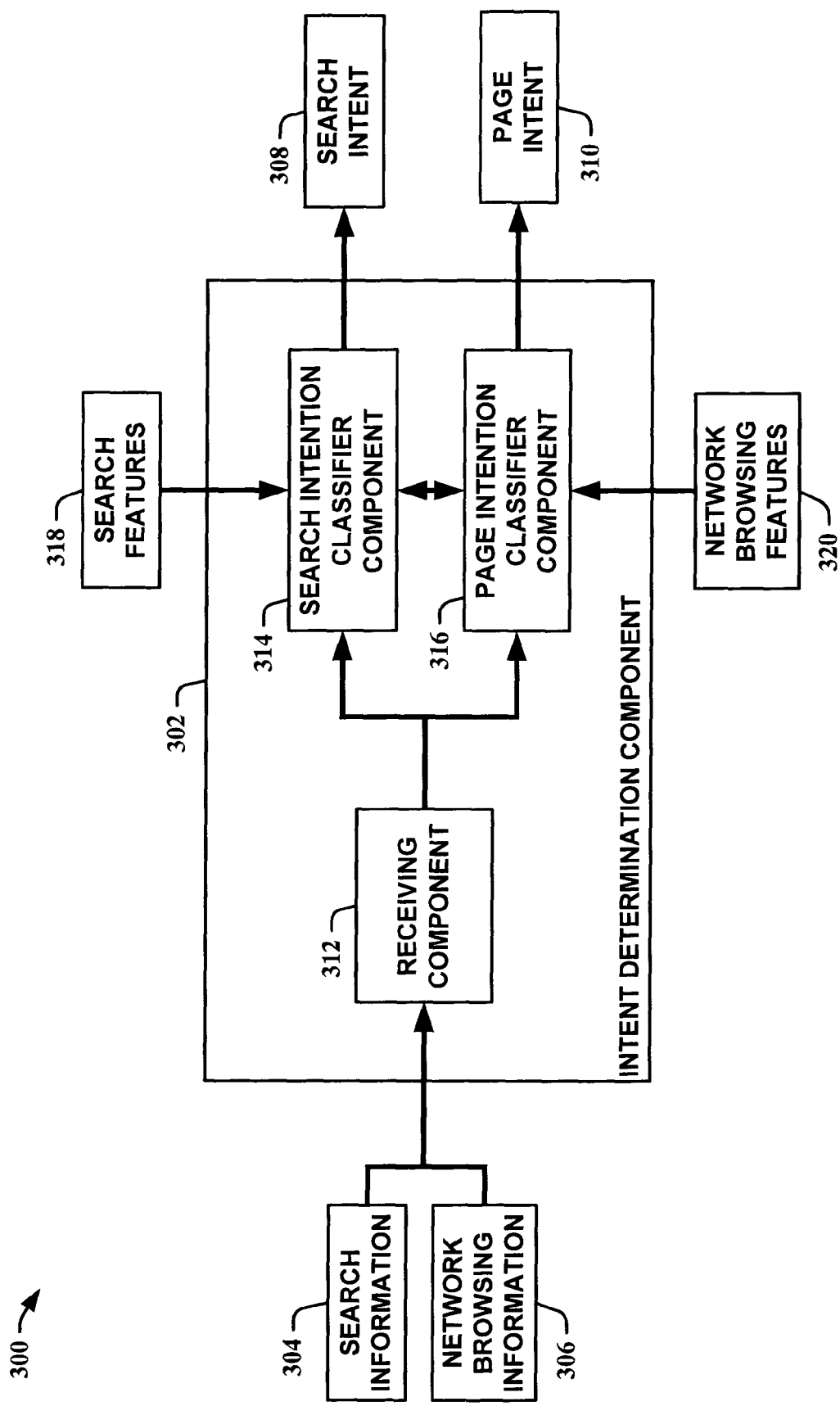
FIG. 3 is yet another block diagram of an intent determination system in accordance with an aspect of an embodiment.

Turning to FIG. 3, yet another block diagram of an intent determination system 300 in accordance with an aspect of an embodiment is illustrated. The intent determination system 300 is comprised of an intent determination component 302 that obtains search information 304 and/or network browsing information 306 and provides search intent 308 and/or page intent 310. The intent determination component 302 is comprised of a receiving component 312, search intention classifier component 314, and a page intention classifier component 316. The receiving component 312 obtains the search information 304 and/or the network browsing information 306 from, for example, an intranet and/or an Internet source and the like. The search information 304 and/or the network browsing information 306 represent information that is to be classified with regard to intent.

The page intention classifier component 316 determines the intent of the network browsing information 306 and provides the page intent 310. It 316 employs a page intent model that is trained utilizing network browsing features 320. The search intention classifier component 314 employs a search intent model (which can include, for example, all or portions of the page intent model) that is trained utilizing search features 318. The search intention classifier component 314 receives the search information 304 from the receiving component 312 and processes the search information 304 by utilizing, at least in part, search results based on the search information 304 and the page intention classifier component 316 to facilitate in classifying the network browsing information 306. The search results are processed with the page intention classifier component 316 and their determined intent is then combined utilizing learned combine coefficients (discussed in detail infra) to provide the search intent 308.

Figure 4:
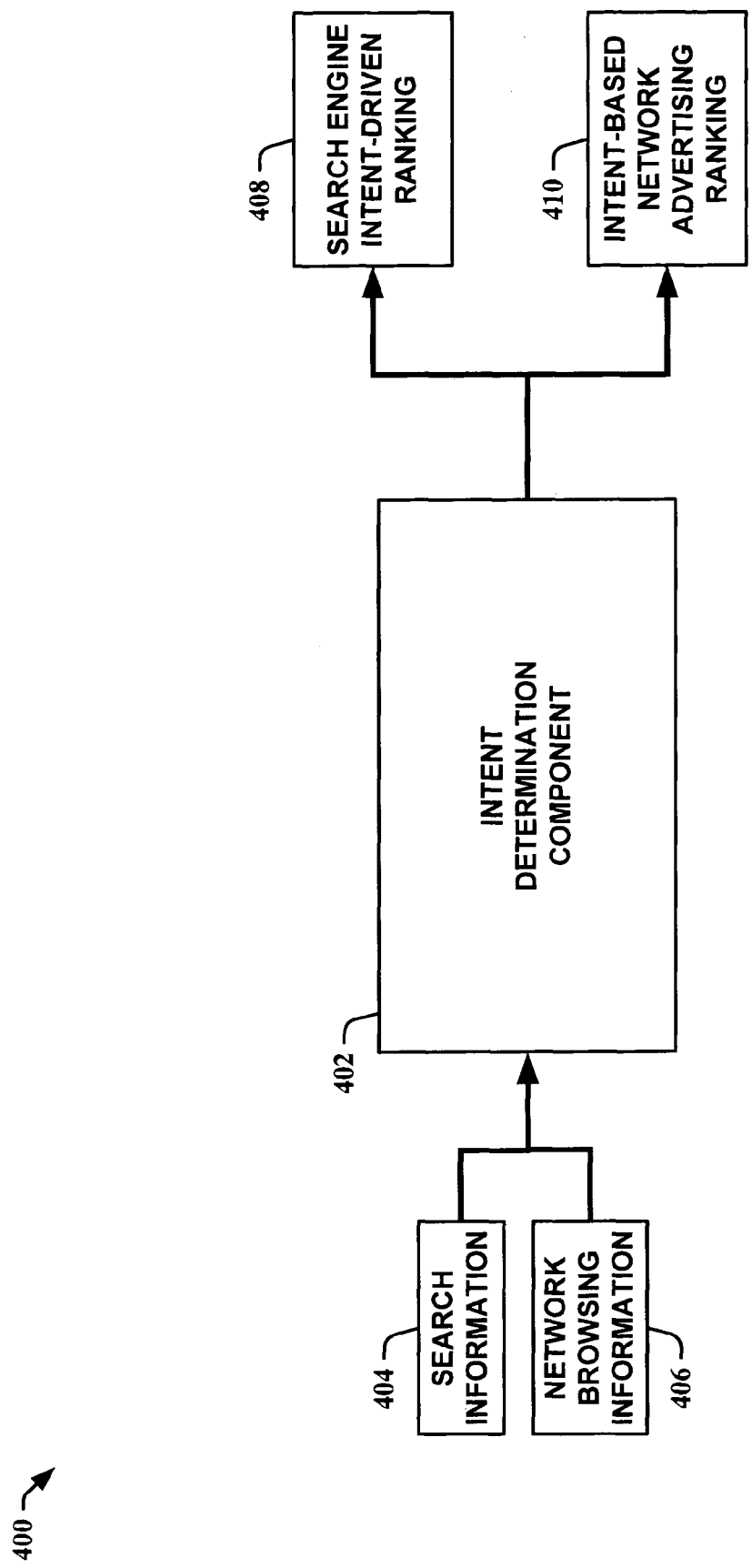
FIG. 4 is still yet another block diagram of an intent determination system in accordance with an aspect of an embodiment.

Referring to FIG. 4, still yet another block diagram of an intent determination system 400 in accordance with an aspect of an embodiment is shown. The intent determination system 400 is comprised of an intent determination component 402 that obtains search information 404 and/or network browsing information 406 and provides search engine intent-driven ranking 408 and/or intent-based network advertising ranking 410. Similar to intent determination system 300, the intent determination system 400 can be employed to provide intent determinations to support different types of systems such as, for example, the search engine intent-driven ranking 408 and/or the intent-based network advertising ranking 410 and the like. The intent determination component 402 can utilize intent models that are trained utilizing search features 412 and/or network browsing features 414 to facilitate in determining intent. Thus, the intent determination system 400 can provide online commercial intention for intent-based search engines and/or intent-based advertising mechanisms and the like.

Figure 5:
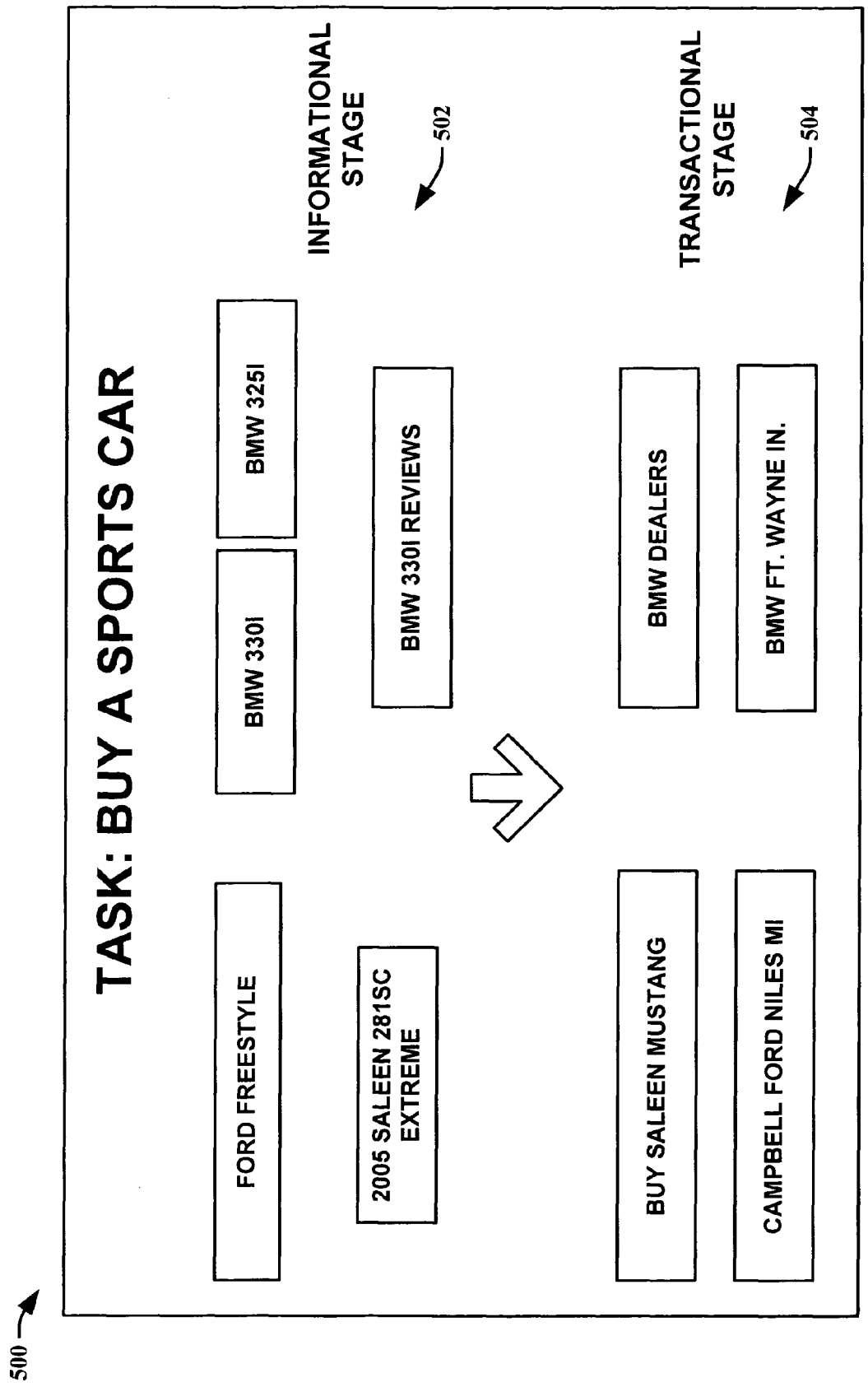
FIG. 5 is an illustration of an example of an intention change in a search in accordance with an aspect of an embodiment.

Instances of the systems and methods herein provide a means to automatically detect the degree of a user's purchase intention (i.e., online commercial intention or OCI) through the user's online behavior (e.g., browsing and/or searching a network). The fundamental business rationale of online advertising is that a user's online activities indicate that the user may be in the process of purchasing. Typically there are two major stages in a purchase activity, namely an informational stage—where the user is researching brand and/or product/service information and a transactional stage—where a user decides which brand and/or product/service to buy. FIG. 5 illustrates an example 500 of an intention change in a search in accordance with an aspect of an embodiment. The example 500 shows an intention change with regard to purchasing a sports car.

Online users have different information needs in these two different stages. Serving the right advertisements for the purchase stage can dramatically increase the efficiency of an advertisement campaign. For the example 500 above, when the user is still at the informational stage 502 searching for "Ford Freestyle," the advertiser would be better off providing more information and/or selections of "Ford Freestyle" and/or an incentive for the user to come back to the advertiser's web site, rather than only providing the user with one of the Ford Freestyle cars and a price tag. On the other hand, when the user is already at the transactional stage 504, searching for "Campbell Ford Niles Mich.," it would be best for the advertisers to display, for example, detailed prices, features, and/or discount information and the like about that car dealer instead of a crowded list of many other cars.

Figure 6:
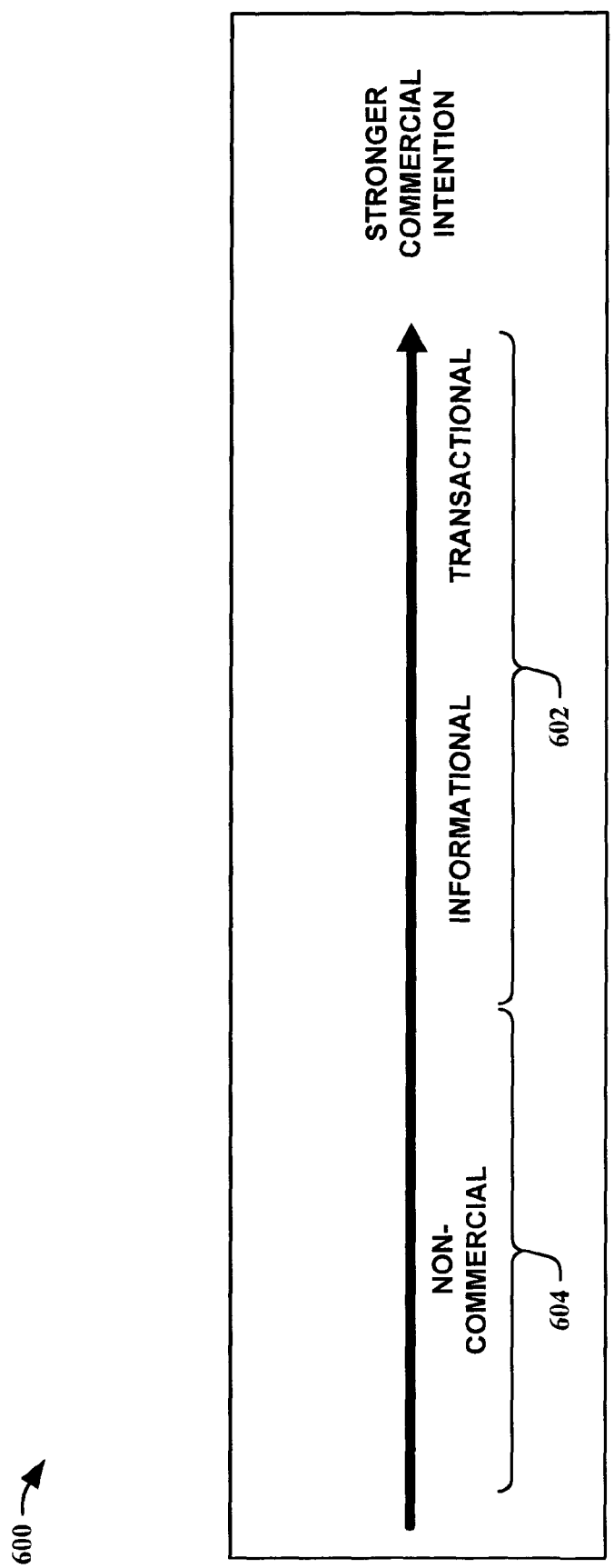
FIG. 6 is an illustration of degrees of online commercial intention (OCI) in accordance with an aspect of an embodiment.

Different degrees of a user's purchase intention, that is, whether or not the user is in the process of purchasing, and if they are, how strongly the user wants to purchase is defined as online commercial intention and is illustrated in a graph 600 in FIG. 6. First, online activities are divided into two groups, commercial 602 (e.g., a user browses online store product purchase pages and/or product/price comparison site, etc.) and non-commercial 604 (e.g., a user browses academic course page, government page, and/or news pages, etc.). For commercial activities, two subclasses are defined based on the two stages that a user usually goes through during online purchasing, namely informational—when a user is researching a product and/or service and transactional—when a user has a strong intention to purchase (e.g., ready to put the item into shopping cart and/or wish list).

Instances of the systems and methods herein can be utilized to provide a means to automatically detect the online commercial intention behind network browsing activities and/or to automatically detect the online commercial intention behind network searching activities. To automatically classify web pages and/or search queries into the right intentions, machine learning classifiers are constructed based on features extracted from web pages and/or search queries.

An instance can also be utilized to provide an OCI-driven ranking mechanism. Traditional search engines serve information based on the content similarity between the keywords from search queries and the keywords from web page content. OCI-driven ranking promotes the information that matches with the intention behind the web page browsed and/or search queries. This ranking mechanism can substantially improve a user's satisfaction, especially for serving advertisements. Another instance provides OCI for advertisement bidding systems. A higher price, for example, can be set for showing advertisements on web pages with very strong purchase intention and the like. Other instances can be applied to facilitate systems and/or methods in determining whether an online user intends to purchase something and/or how strongly the user desires to purchase.

Instances of the systems and methods herein can be utilized, for example, to classify web pages (e.g., including advertisement pages) and/or search queries into three types of online commercial intention, namely non-commercial, commercial—informational (or "informational"), and commercial—transactional (or "transactional"). Instances can also, for example, automatically classify web pages into the three types of online commercial intention utilizing, for example, a page intention classifier. Additionally, instances can also automatically classify search queries into the three types of online commercial intention utilizing, for example, a search intention classifier. And, furthermore, instances can also provide a machine learning algorithm that optimizes performance in detecting online commercial intention from search queries.

Figure 7:
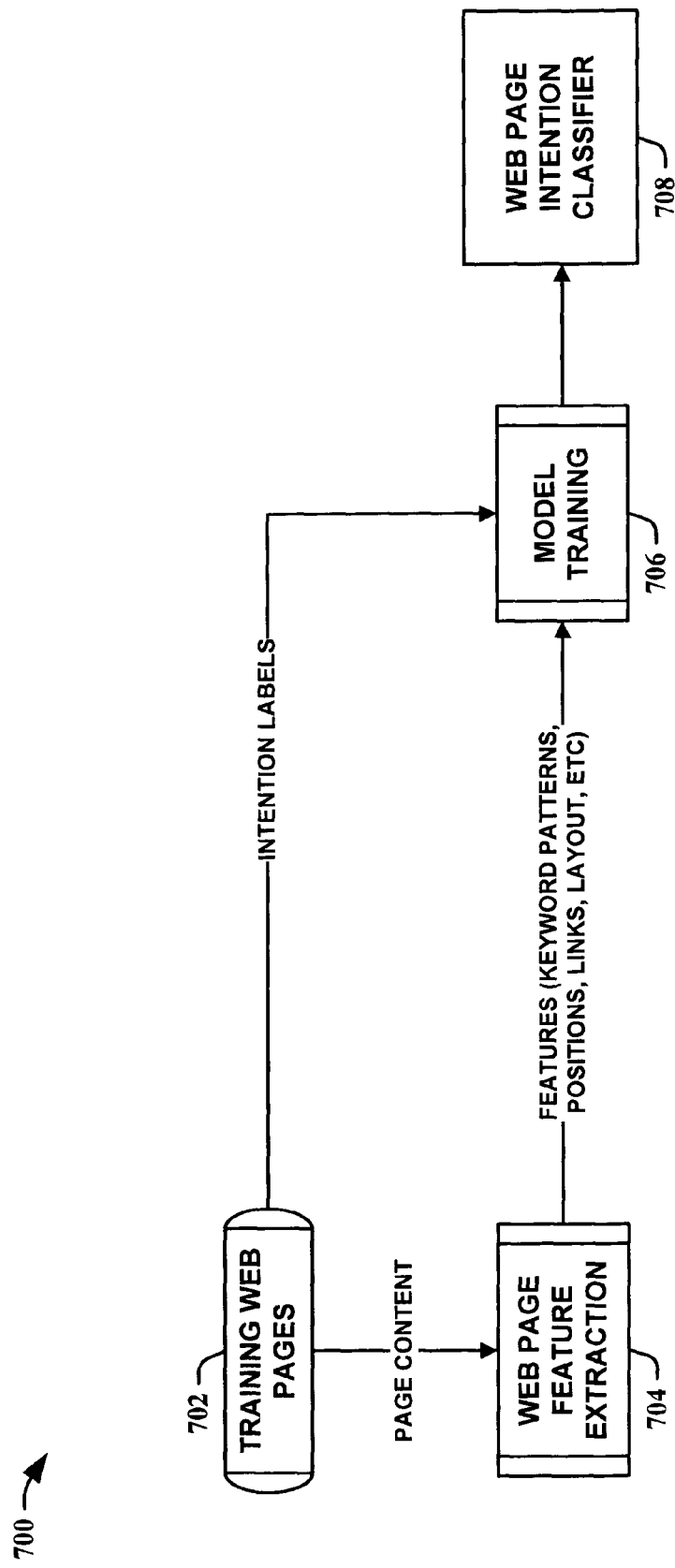
FIG. 7 is an illustration of an example of constructing a web page intention classifier in accordance with an aspect of an embodiment.

In FIG. 7, an illustration of an example 700 of constructing a web page intention classifier 708 in accordance with an aspect of an embodiment is shown. First, training web pages 702 with intention labels are used for web page feature extraction 704. The extracted features differentiate different page OCIs from the web page contents. Model training 706 is accomplished by employing the intention labels from the training web pages 702 and the extracted features from the web page feature extraction 704. A machine learning algorithm is applied to train a model based on the extracted features (e.g., keyword patterns, positions, links, layout, etc.) to provide a web page intention classifier 708.

Figure 8:
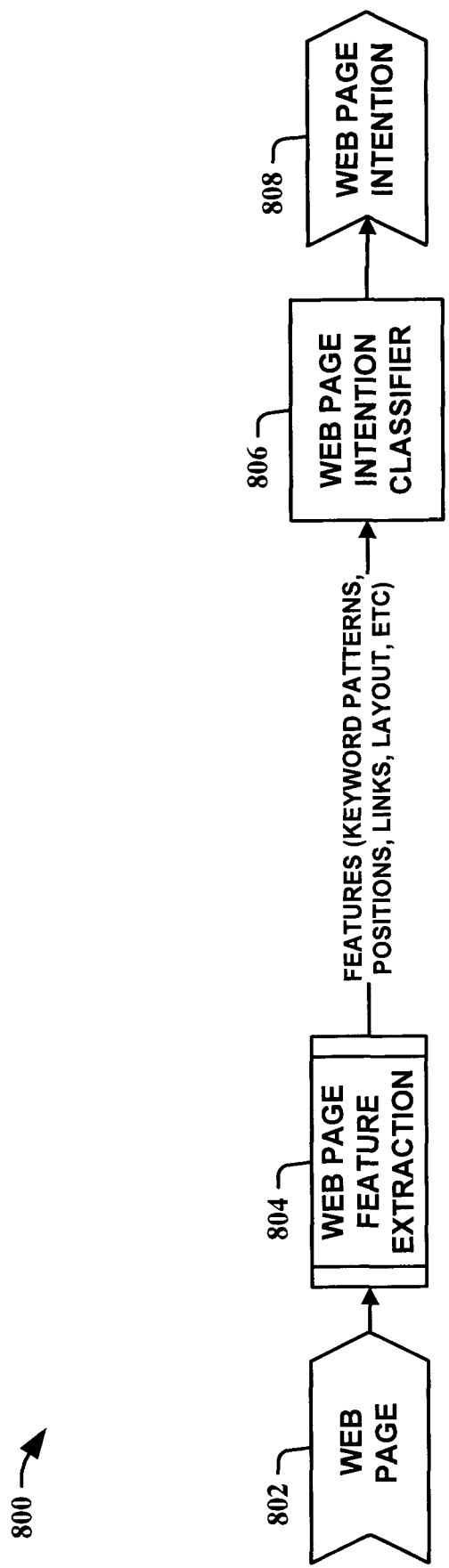
FIG. 8 is an illustration of an example of predicting web page intention utilizing a web page intention classifier in accordance with an aspect of an embodiment.

Looking at FIG. 8, an illustration of an example 800 of predicting web page intention utilizing a web page intention classifier in accordance with an aspect of an embodiment is depicted. When a web page 802 is obtained for classifying, web page feature extraction 804 occurs. The extracted features are, at least in part, the features that were utilized in the training phase. A web page intention classifier 806 then employs the extracted features (e.g., keyword patterns, positions, links, layout, etc.) to determine a web page intention based on the online commercial intention of that web page 802.

Figure 9:
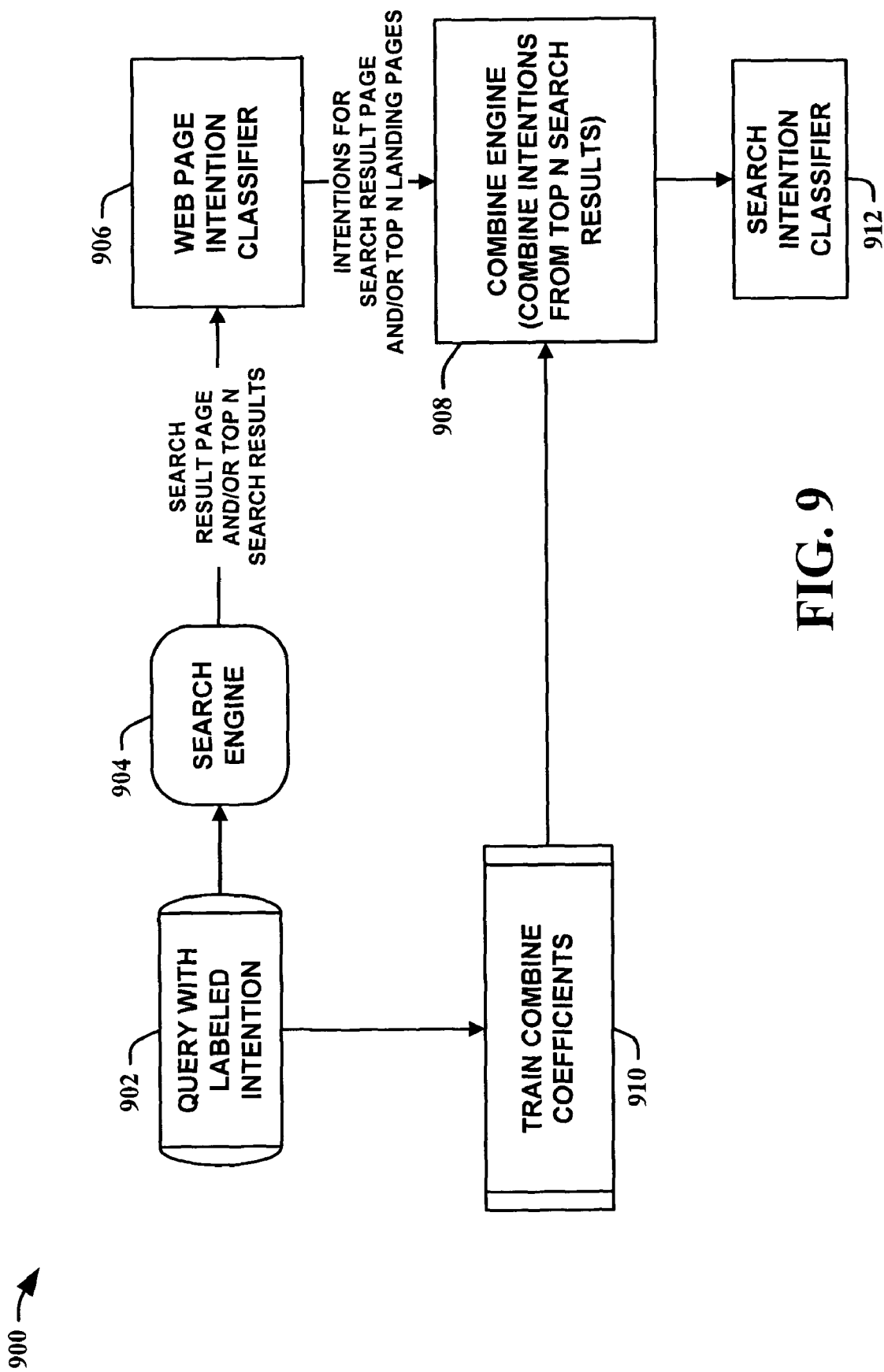
FIG. 9 is an illustration of an example of constructing a search intention classifier in accordance with an aspect of an embodiment.

Turning to FIG. 9, an illustration of an example 900 of constructing a search intention classifier 912 in accordance with an aspect of an embodiment is shown. A query with labeled intention 902 is processed by a search engine 904. A result page returned from the search engine 904 and/or the top N results (where N is an integer from one to infinity) of the search are sent to a web page intention classifier 906. Typically, a first (or highest ranking) result page is utilized in an optimized approach. The search result page can contain, for example, query snippets, sponsored links, and/or other information related to a search query and the like. The search result page and/or each of the top N results are treated as a web page. The web page intention classifier 906 determines the OCI for the search result page and/or each search result. In some instances, for example, the web page intention classifier 906 can include a page classifier constructed specifically to process the special fixed page structure of a search result page. A combine engine 908 combines the OCIs for the search result page and/or the top N search results returned from the search engine 904 to compute a search intention for the query with labeled intention 902, providing a search intention classifier 912. Here N and weighting coefficients in the combine engine 908 are subject to optimization in order to get the best classification accuracy.

The combine engine 908, in one instance, utilizes linear combination of the search results. The query with labeled intention 902 can be utilized to train combine coefficients 910. Machine learning algorithms can be utilized to tune these parameters. The web page intention classifier 906 and the combine engine 908 can be used together as the search intention classifier 912. One skilled in the art can appreciate that other parameters can be utilized to replace and/or augment the top N results and remain within the scope of the systems and methods herein. For example, other data sources such as search logs, snippets, sponsored links, click logs, and/or advertisement click logs and the like can be employed as well.

Figure 10:
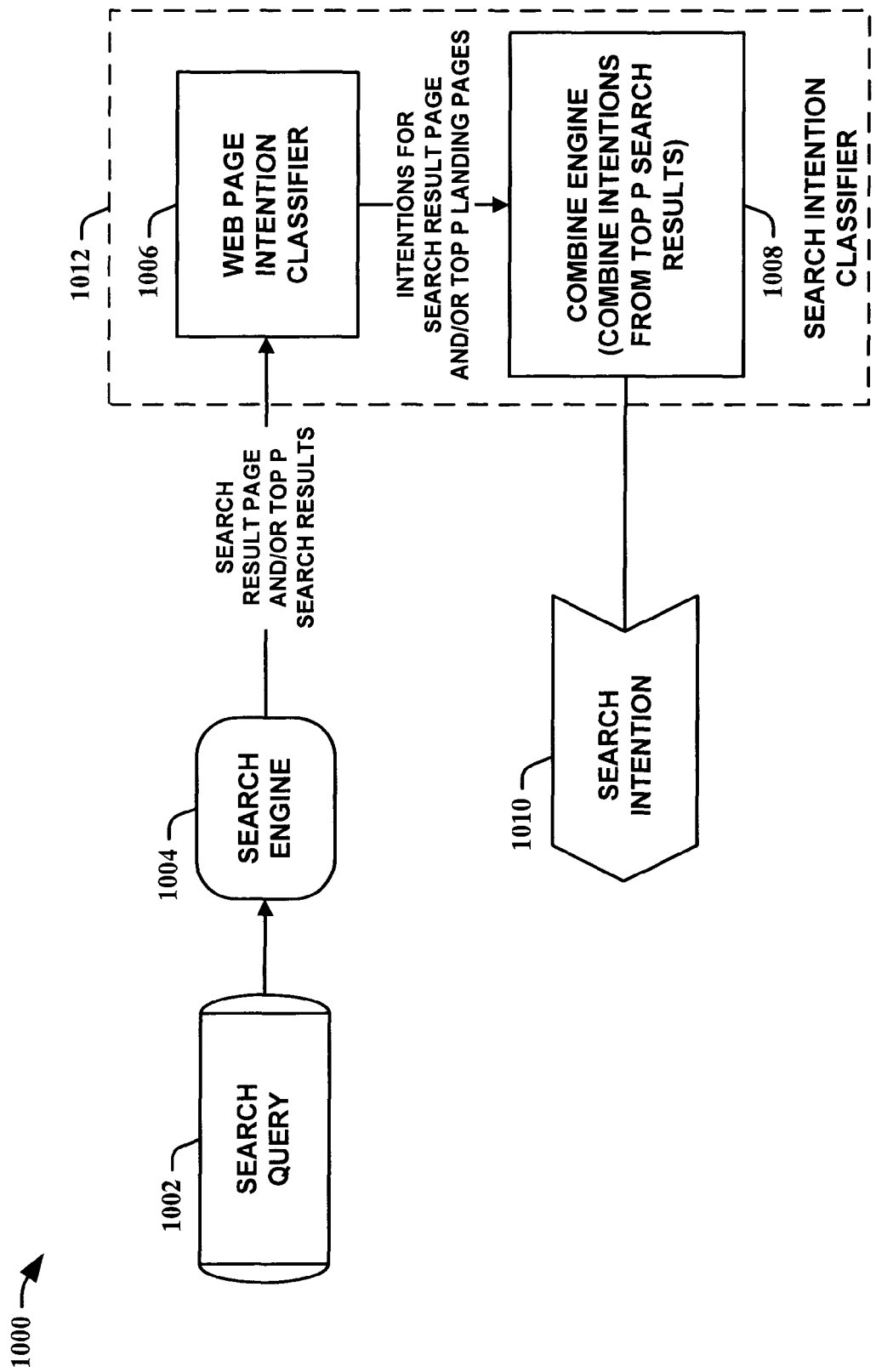
FIG. 10 is an illustration of an example of predicting search intention utilizing a web page intention classifier and a combine engine as a search intention classifier in accordance with an aspect of an embodiment.

Referring to FIG. 10, an illustration of an example of predicting search intention utilizing a web page intention classifier 1006 and a combine engine 1008 as a search intention classifier 1012 in accordance with an aspect of an embodiment are depicted. When a search query 1002 comes, the search query 1002 is sent to the search engine 1004. A search result page and/or the top P search results are obtained by the search engine 1004, where P is an integer from one to infinity (and can be different from N). The search result page and/or the top P results are treated as individual web pages. Then each web page is passed to a web page intention classifier 1006 which determines the OCI for each search result. In some instances, for example, the web page intention classifier 1006 can include a page classifier constructed specifically to process the special fixed page structure of a search result page. The OCIs are then passed to the combine engine 1008. The combine engine 1008 can apply optimized coefficients to the OCIs and return a combined OCI as the search intention 1010 for this query. One skilled in the art can appreciate that other parameters can be utilized to replace or augment the top P results and remain within the scope of the systems and methods herein. For example, other data sources such as search logs, snippets, sponsored links, click logs, and/or advertisement click logs and the like can be employed as well.

Figure 11:
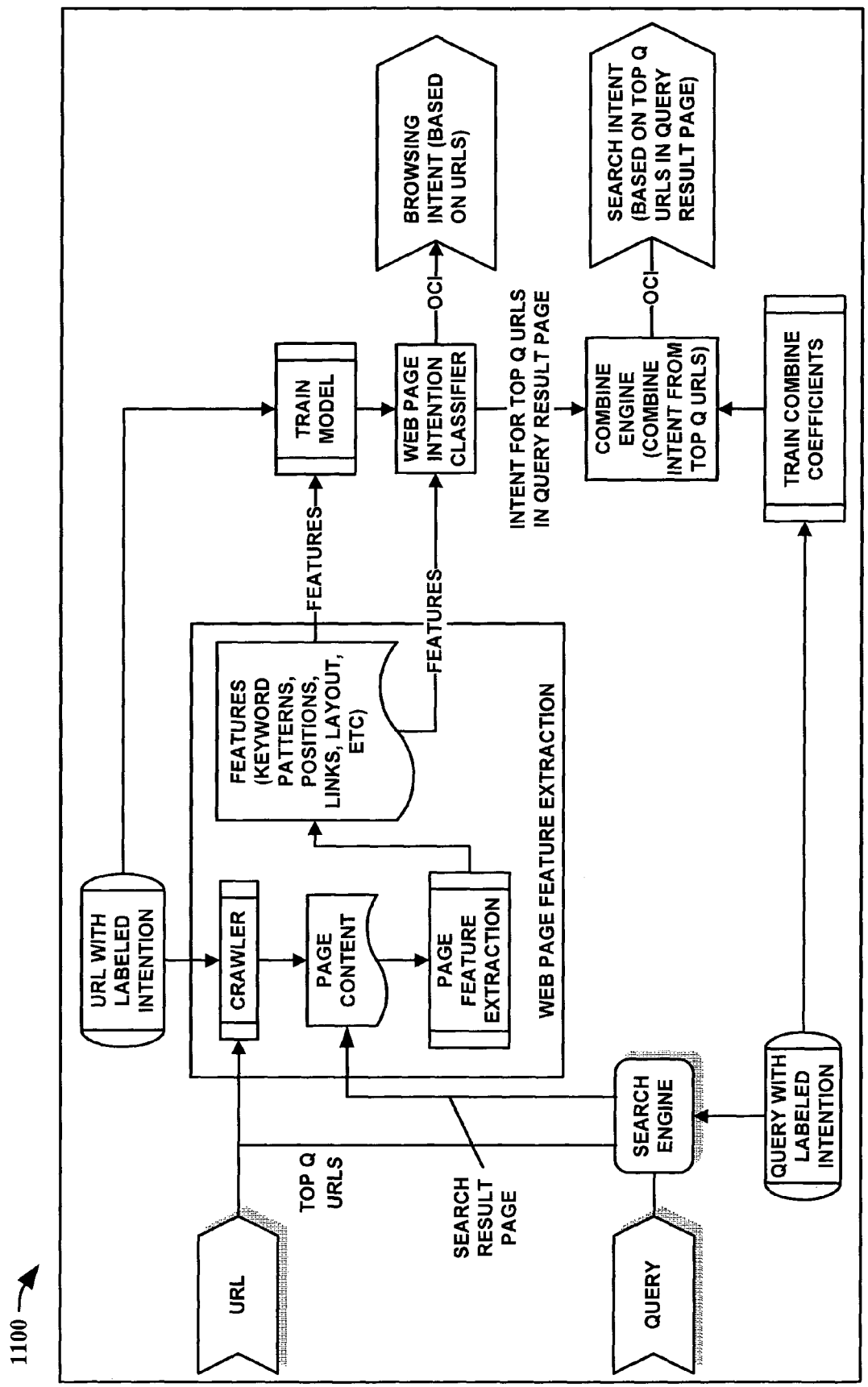
FIG. 11 is an illustration of an example implementation of an online commercial intention system architecture in accordance with an aspect of an embodiment.
Figure 12:
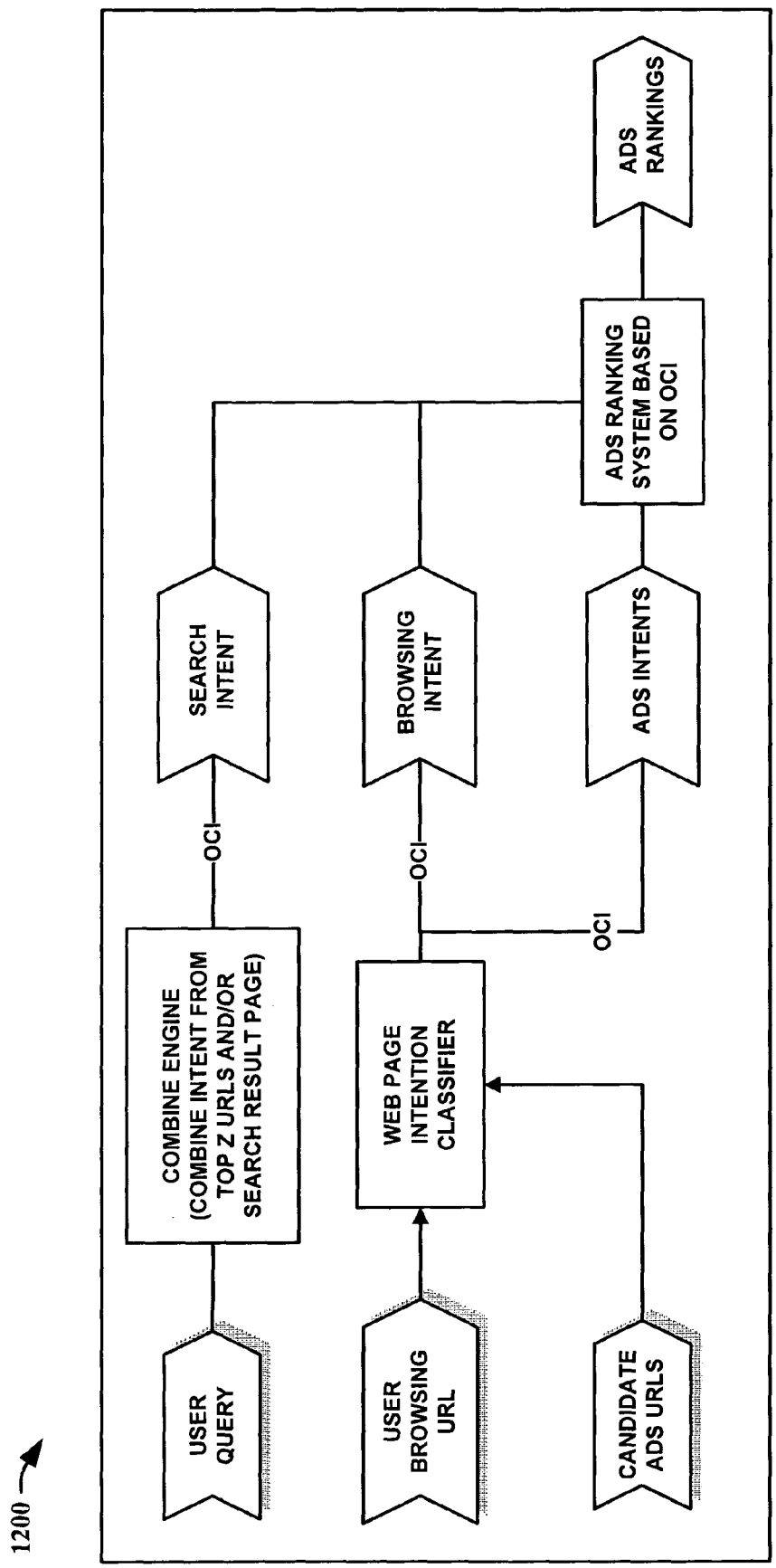
FIG. 12 is an illustration of an example implementation of an OCI advertisement ranking system in accordance with an aspect of an embodiment.
Figure 13:
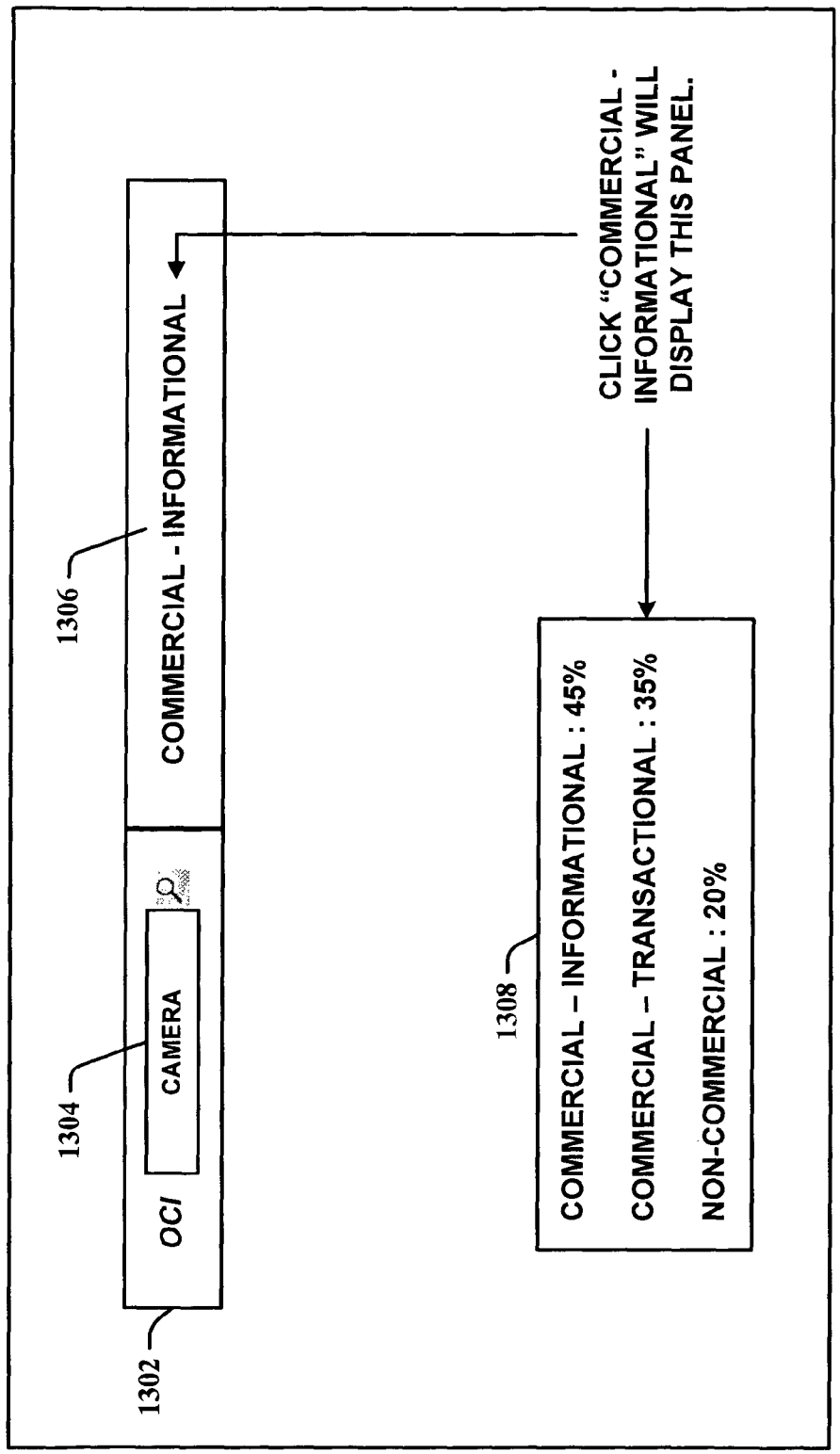
FIG. 13 is an illustration of an example user interface for an online commercial intention system in accordance with an aspect of an embodiment.

Moving on to FIG. 11, an illustration of an example implementation of an online commercial intention system architecture 1100 in accordance with an aspect of an embodiment is shown. The architecture 1100 provides a training process, online process, and feature extraction process in one system (where Q represents an integer from one to infinity). Turning to FIG. 12, an illustration of an example implementation of an OCI advertisement ranking system 1200 in accordance with an aspect of an embodiment is depicted (where Z represents an integer from one to infinity). Instances of the systems and methods herein can also be incorporated into an example user interface 1300 as illustrated in FIG. 13. A toolbar 1302 for search entries displays a search query 1304 and then displays the OCI 1306. If a user clicks on the OCI 1306, a secondary display 1308 can appear showing OCI type percentages.

In view of the exemplary systems shown and described above, methodologies that may be implemented in accordance with the embodiments will be better appreciated with reference to the flow charts of FIGS. 14-17. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

Figure 14:
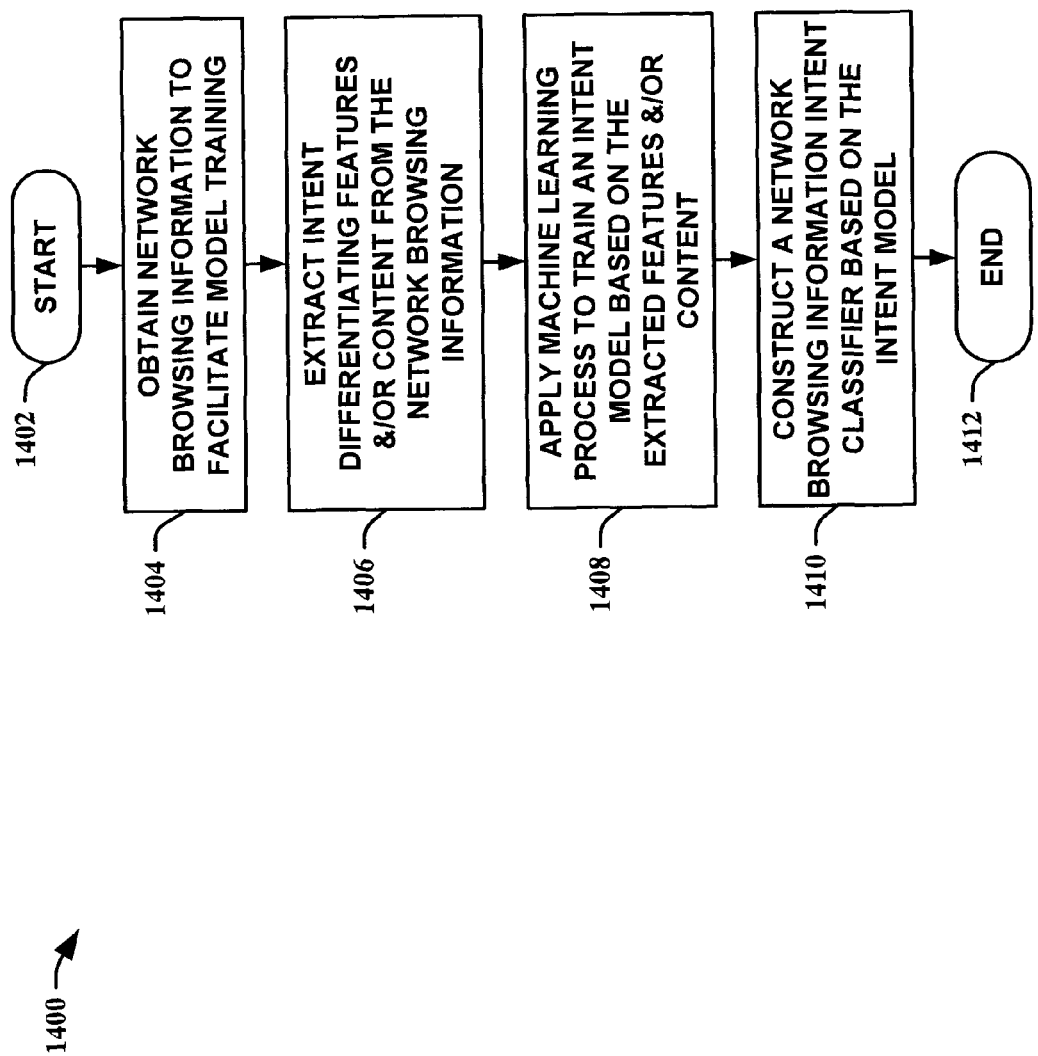
FIG. 14 is a flow diagram of a method of constructing a network browsing information intent classifier in accordance with an aspect of an embodiment.

In FIG. 14, a flow diagram of a method 1400 of constructing a network browsing information intent classifier in accordance with an aspect of an embodiment is shown. The method 1400 starts 1402 by obtaining network browsing information to facilitate model training 1404. The network browsing information can include, but is not limited to, Internet and/or intranet web pages, universal resource locators (URLs), and/or statistical browsing data and the like. Intent differentiating features and/or content are then extracted from the network browsing information 1406. These features/content facilitate in differentiating the different types of online commercial intention (OCI), namely non-commercial, informational, and transactional. The features can include, but are not limited to, keyword patterns, positions, links, and/or layout and the like. A machine learning process is applied to train an intent model based on the extracted features and/or content 1408. The machine learning process, for example, can include SVM-based learning and the like. A network browsing information intent classifier is then constructed based on the intent model 1410, ending the flow 1412. The classifier can be employed to facilitate in determining the OCI type of, for example, a web page and the like.

Figure 15:
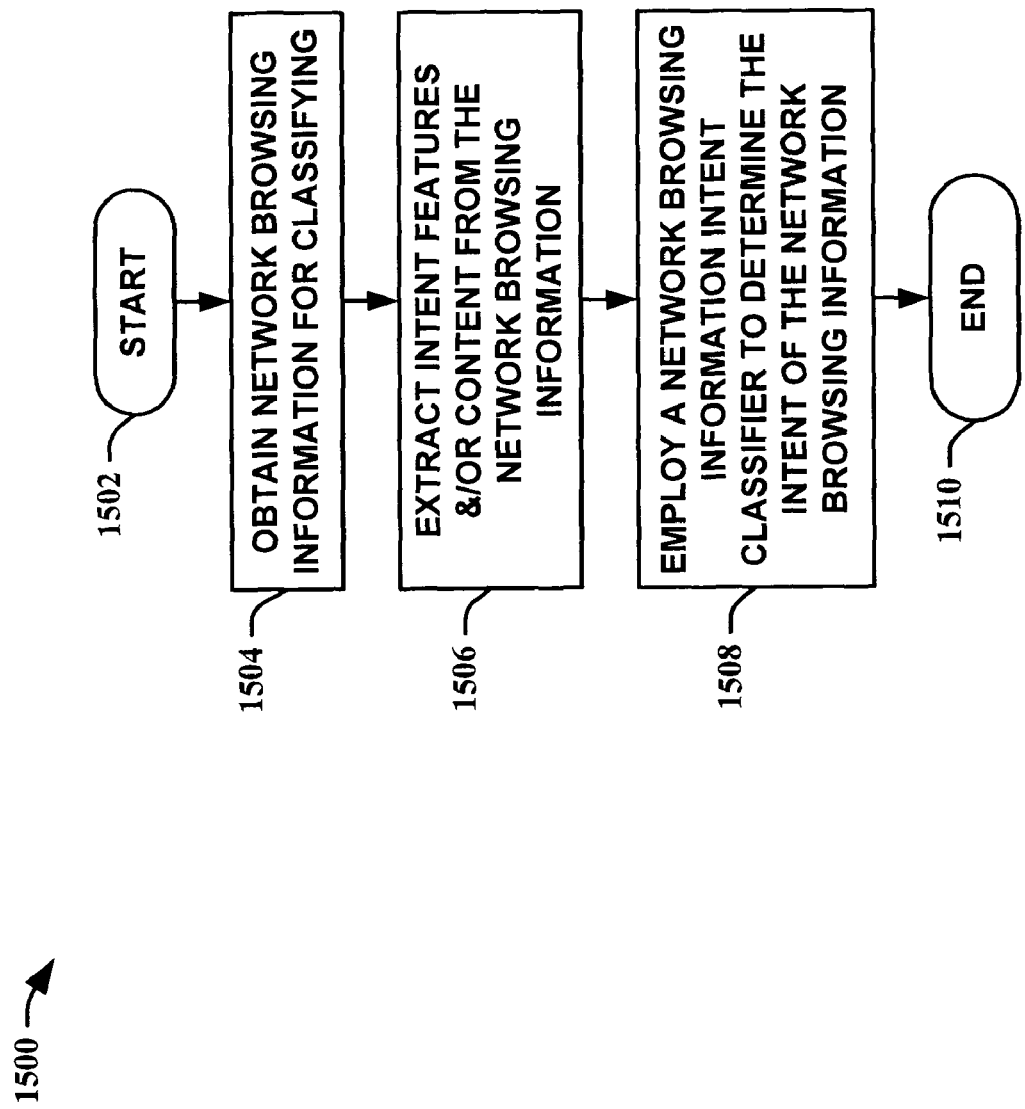
FIG. 15 is a flow diagram of a method of classifying intent of network browsing information in accordance with an aspect of an embodiment.

Turning to FIG. 15, a flow diagram of a method 1500 of classifying intent of network browsing information in accordance with an aspect of an embodiment is illustrated. The method 1500 starts 1502 by obtaining network browsing information for classifying 1504. The network browsing information can include, but is not limited to, Internet and/or intranet web pages, universal resource locators (URLs), and/or statistical browsing data and the like. For example, the information can originate from an advertising system, directly from a user, and/or from a search engine that needs search result pages to be processed and the like. Intent features and/or content are then extracted from the network browsing information 1506. A network browsing information intent classifier is then employed to determine the intent of the network browsing information 1508, ending the flow 1510. The network browsing information intent classifier compares the extracted intent features and/or content with features that differentiate the different types of online commercial intention (OCI) to determine the intent.

Figure 16:
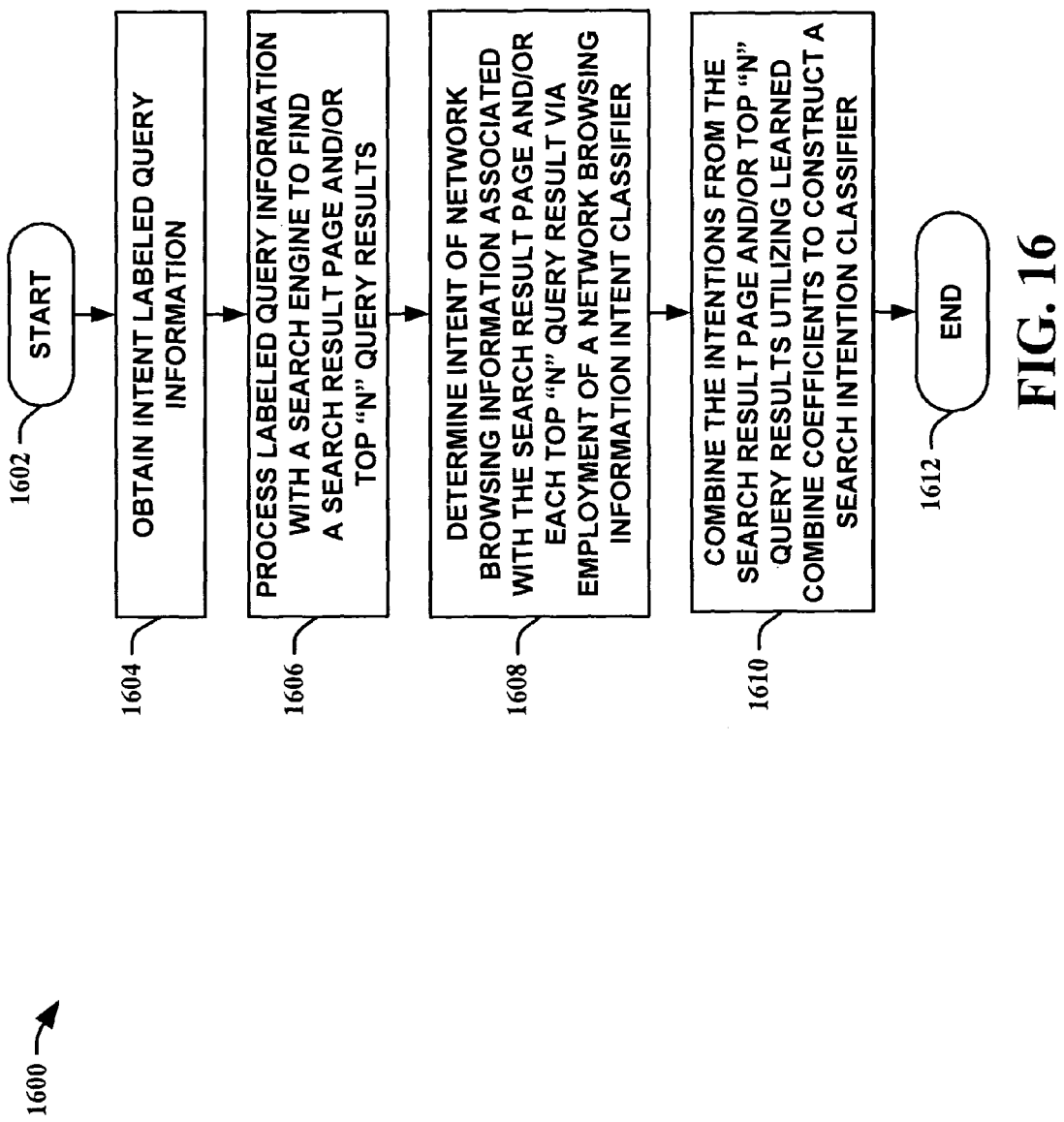
FIG. 16 is a flow diagram of a method of constructing a search intent classifier in accordance with an aspect of an embodiment.

Looking at FIG. 16, a flow diagram of a method 1600 of constructing a search intent classifier in accordance with an aspect of an embodiment is depicted. The method 1600 starts 1602 by obtaining intent labeled query information 1604. The query information can include, but is not limited to, search keywords and/or phrases, and/or statistical search data and the like. The labeled query information is then processed with a search engine to find a search result page and/or top "N" query results 1606, where "N" is an integer from one to infinity. Typically, a first (or highest ranking) result page is utilized in an optimized approach. The search result page can contain, for example, query snippets, sponsored links, and/or other information related to a search query and the like. The intent of the network browsing information associated with the search result page and/or each top "N" query result is then determined via employment of a network browsing information intent classifier 1608. In some instances, for example, the network browsing information intent classifier can include an intent classifier constructed specifically to process the special fixed page structure of a search result page. The intentions from the search result page and/or the top "N" query results are combined utilizing learned combine coefficients to construct a search intention classifier 1610, ending the flow 1612. Machine learning can be employed to facilitate learning of the combine coefficients. One skilled in the art can appreciate that other parameters can be utilized to replace or augment the search result page and/or the top "N" results and remain within the scope of the systems and methods herein. For example, other data sources such as search logs, snippets, sponsored links, click logs, and/or advertisement click logs and the like can be employed as well.

Figure 17:
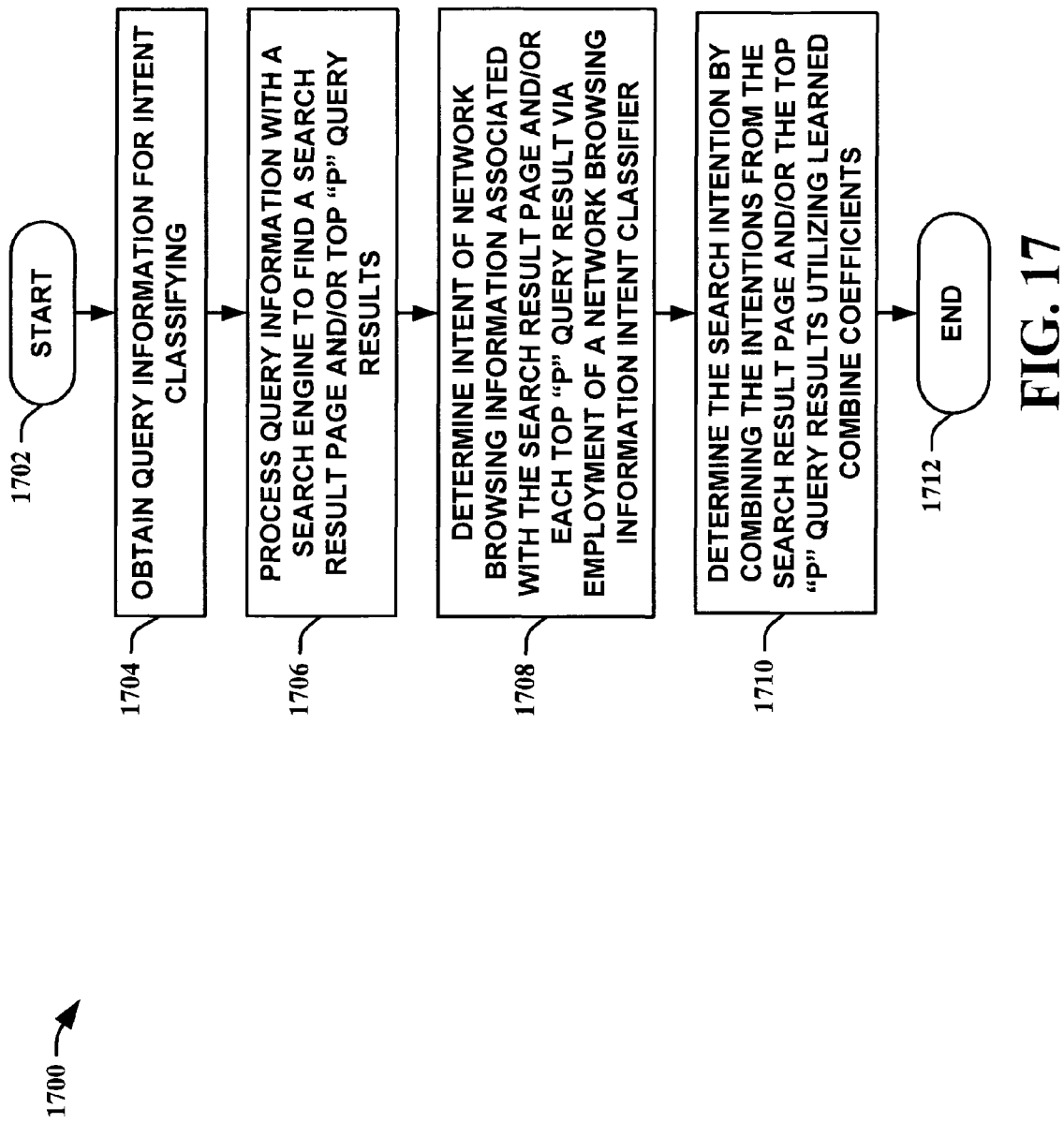
FIG. 17 is a flow diagram of a method of classifying intent of search information in accordance with an aspect of an embodiment.

Moving on to FIG. 17, a flow diagram of a method 1700 of classifying intent of search information in accordance with an aspect of an embodiment is shown. The method 1700 starts 1702 by obtaining query information for intent classifying 1704. The query information is then processed with a search engine to find a search result page and/or top "P" query results 1706, where "P" is an integer from one to infinity (note: the number of results utilized to train a query intent model does not necessarily have to be the same as the number of results utilized to classify a query's intent). Typically, a first (or highest ranking) result page is utilized in an optimized approach. The search result page can contain, for example, query snippets, sponsored links, and/or other information related to a search query and the like. The intent of network browsing information associated with the search result page and/or each top "P" query result is then determined via employment of a network browsing information intent classifier 1708. The network browsing information intent classifier can be constructed per method 1400 and employed per method 1500 supra. In some instances, for example, the network browsing information intent classifier can include an intent classifier constructed specifically to process the special fixed page structure of a search result page. The search intention is determined by combining the intentions from the search result page and/or the top "P" query results utilizing learned combine coefficients 1710, ending the flow 1712. One skilled in the art can appreciate that other parameters can be utilized to replace or augment the search result page and/or the top "N" results and remain within the scope of the systems and methods herein. For example, other data sources such as search logs, snippets, sponsored links, click logs, and/or advertisement click logs and the like can be employed as well.

Figure 18:
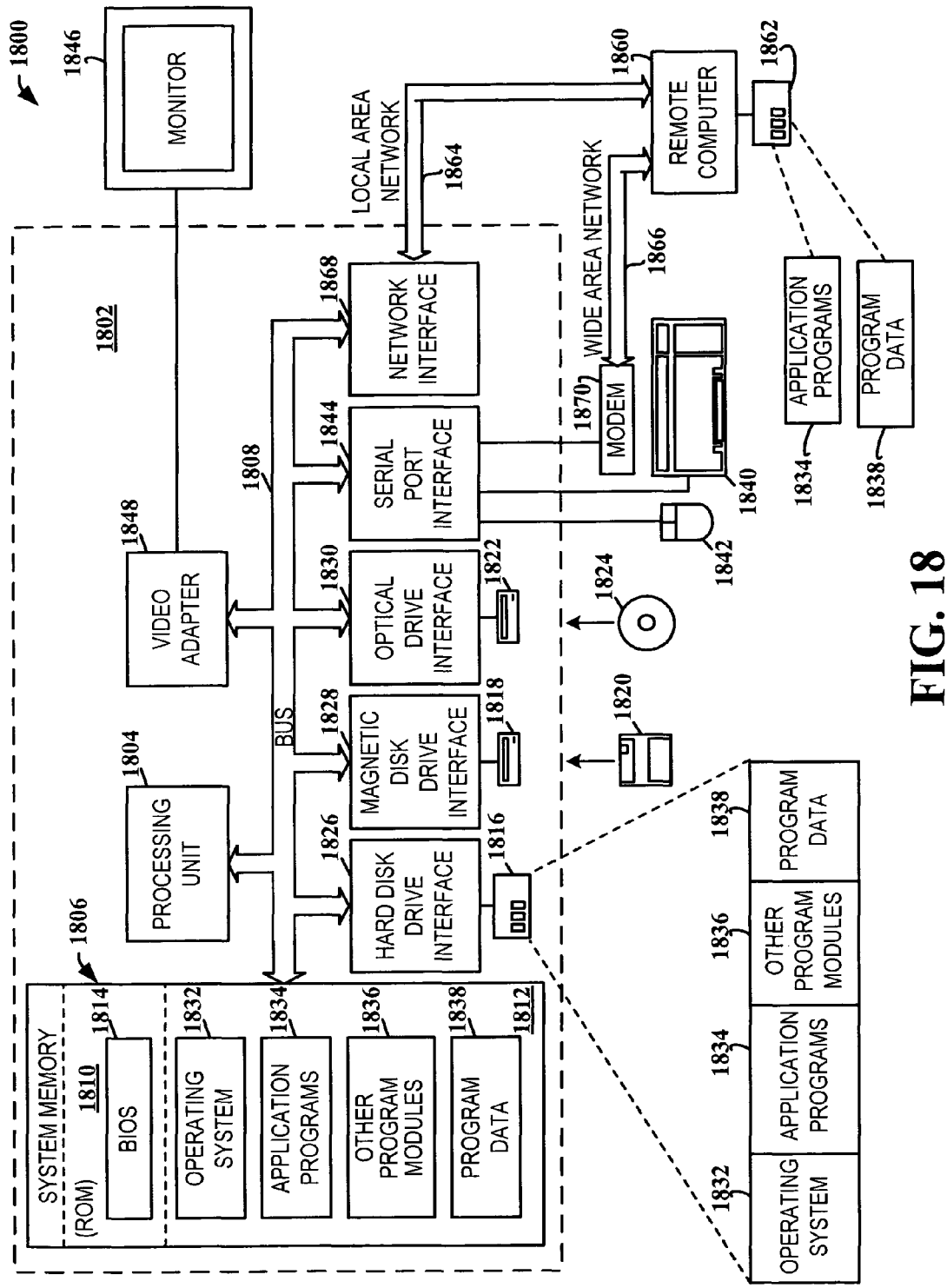
FIG. 18 illustrates an example operating environment in which an embodiment can function.

In order to provide additional context for implementing various aspects of the embodiments, FIG. 18 and the following discussion is intended to provide a brief, general description of a suitable computing environment 1800 in which the various aspects of the embodiments can be performed. While the embodiments have been described above in the general context of computer-executable instructions of a computer program that runs on a local computer and/or remote computer, those skilled in the art will recognize that the embodiments can also be performed in combination with other program modules. Generally, program modules include routines, programs, components, data structures, etc., that perform particular tasks and/or implement particular abstract data types. Moreover, those skilled in the art will appreciate that the inventive methods can be practiced with other computer system configurations, including single-processor or multi-processor computer systems, minicomputers, mainframe computers, as well as personal computers, hand-held computing devices, microprocessor-based and/or programmable consumer electronics, and the like, each of which can operatively communicate with one or more associated devices. The illustrated aspects of the embodiments can also be practiced in distributed computing environments where certain tasks are performed by remote processing devices that are linked through a communications network. However, some, if not all, aspects of the embodiments can be practiced on stand-alone computers. In a distributed computing environment, program modules can be located in local and/or remote memory storage devices.

With reference to FIG. 18, an exemplary system environment 1800 for performing the various aspects of the embodiments include a conventional computer 1802, including a processing unit 1804, a system memory 1806, and a system bus 1808 that couples various system components, including the system memory, to the processing unit 1804. The processing unit 1804 can be any commercially available or proprietary processor. In addition, the processing unit can be implemented as multi-processor formed of more than one processor, such as can be connected in parallel.

The system bus 1808 can be any of several types of bus structure including a memory bus or memory controller, a peripheral bus, and a local bus using any of a variety of conventional bus architectures such as PCI, VESA, Microchannel, ISA, and EISA, to name a few. The system memory 1806 includes read only memory (ROM) 1810 and random access memory (RAM) 1812. A basic input/output system (BIOS) 1814, containing the basic routines that help to transfer information between elements within the computer 1802, such as during start-up, is stored in ROM 1810.

The computer 1802 also can include, for example, a hard disk drive 1816, a magnetic disk drive 1818, e.g., to read from or write to a removable disk 1820, and an optical disk drive 1822, e.g., for reading from or writing to a CD-ROM disk 1824 or other optical media. The hard disk drive 1816, magnetic disk drive 1818, and optical disk drive 1822 are connected to the system bus 1808 by a hard disk drive interface 1826, a magnetic disk drive interface 1828, and an optical drive interface 1830, respectively. The drives 1816-1822 and their associated computer-readable media provide nonvolatile storage of data, data structures, computer-executable instructions, etc. for the computer 1802. Although the description of computer-readable media above refers to a hard disk, a removable magnetic disk and a CD, it should be appreciated by those skilled in the art that other types of media which are readable by a computer, such as magnetic cassettes, flash memory, digital video disks, Bernoulli cartridges, and the like, can also be used in the exemplary operating environment 1800, and further that any such media can contain computer-executable instructions for performing the methods of the embodiments.

A number of program modules can be stored in the drives 1816-1822 and RAM 1812, including an operating system 1832, one or more application programs 1834, other program modules 1836, and program data 1838. The operating system 1832 can be any suitable operating system or combination of operating systems. By way of example, the application programs 1834 and program modules 1836 can include an intent determination scheme in accordance with an aspect of an embodiment.

A user can enter commands and information into the computer 1802 through one or more user input devices, such as a keyboard 1840 and a pointing device (e.g., a mouse 1842). Other input devices (not shown) can include a microphone, a joystick, a game pad, a satellite dish, a wireless remote, a scanner, or the like. These and other input devices are often connected to the processing unit 1804 through a serial port interface 1844 that is coupled to the system bus 1808, but can be connected by other interfaces, such as a parallel port, a game port or a universal serial bus (USB). A monitor 1846 or other type of display device is also connected to the system bus 1808 via an interface, such as a video adapter 1848. In addition to the monitor 1846, the computer 1802 can include other peripheral output devices (not shown), such as speakers, printers, etc.

It is to be appreciated that the computer 1802 can operate in a networked environment using logical connections to one or more remote computers 1860. The remote computer 1860 can be a workstation, a server computer, a router, a peer device or other common network node, and typically includes many or all of the elements described relative to the computer 1802, although for purposes of brevity, only a memory storage device 1862 is illustrated in FIG. 18. The logical connections depicted in FIG. 18 can include a local area network (LAN) 1864 and a wide area network (WAN) 1866. Such networking environments are commonplace in offices, enterprise-wide computer networks, intranets and the Internet.

When used in a LAN networking environment, for example, the computer 1802 is connected to the local network 1864 through a network interface or adapter 1868. When used in a WAN networking environment, the computer 1802 typically includes a modem (e.g., telephone, DSL, cable, etc.) 1870, or is connected to a communications server on the LAN, or has other means for establishing communications over the WAN 1866, such as the Internet. The modem 1870, which can be internal or external relative to the computer 1802, is connected to the system bus 1808 via the serial port interface 1844. In a networked environment, program modules (including application programs 1834) and/or program data 1838 can be stored in the remote memory storage device 1862. It will be appreciated that the network connections shown are exemplary and other means (e.g., wired or wireless) of establishing a communications link between the computers 1802 and 1860 can be used when carrying out an aspect of an embodiment.

In accordance with the practices of persons skilled in the art of computer programming, the embodiments have been described with reference to acts and symbolic representations of operations that are performed by a computer, such as the computer 1802 or remote computer 1860, unless otherwise indicated. Such acts and operations are sometimes referred to as being computer-executed. It will be appreciated that the acts and symbolically represented operations include the manipulation by the processing unit 1804 of electrical signals representing data bits which causes a resulting transformation or reduction of the electrical signal representation, and the maintenance of data bits at memory locations in the memory system (including the system memory 1806, hard drive 1816, floppy disks 1820, CD-ROM 1824, and remote memory 1862) to thereby reconfigure or otherwise alter the computer system's operation, as well as other processing of signals. The memory locations where such data bits are maintained are physical locations that have particular electrical, magnetic, or optical properties corresponding to the data bits.

Figure 19:
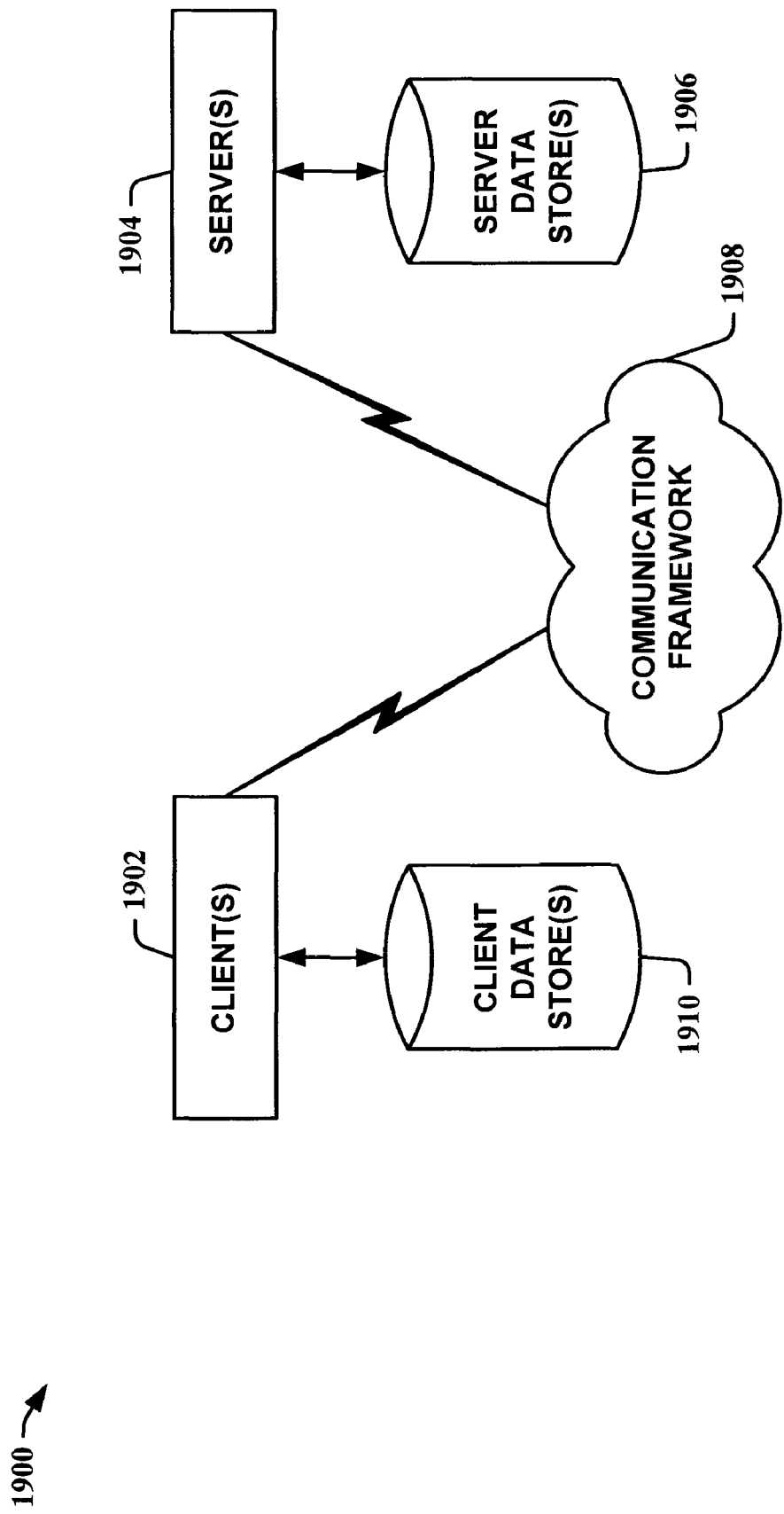
FIG. 19 illustrates another example operating environment in which an embodiment can function.

FIG. 19 is another block diagram of a sample computing environment 1900 with which embodiments can interact. The system. 1900 further illustrates a system that includes one or more client(s) 1902. The client(s) 1902 can be hardware and/or software (e.g., threads, processes, computing devices). The system 1900 also includes one or more server(s) 1904. The server(s) 1904 can also be hardware and/or software (e.g., threads, processes, computing devices). One possible communication between a client 1902 and a server 1904 can be in the form of a data packet adapted to be transmitted between two or more computer processes. The system 1900 includes a communication framework 1908 that can be employed to facilitate communications between the client(s) 1902 and the server(s) 1904. The client(s) 1902 are connected to one or more client data store(s) 1910 that can be employed to store information local to the client(s) 1902. Similarly, the server(s) 1904 are connected to one or more server data store(s) 1906 that can be employed to store information local to the server(s) 1904.

It is to be appreciated that the systems and/or methods of the embodiments can be utilized in intent determination facilitating computer components and non-computer related components alike. Further, those skilled in the art will recognize that the systems and/or methods of the embodiments are employable in a vast array of electronic related technologies, including, but not limited to, computers, servers and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. One or more non-transitory, tangible computer storage media having a system embodied thereon including computer-executable instructions that, when executed, perform a method for determining a user's purchasing intent, comprising:

a training component that:
receives at least one of a training web page having a first purchasing intention label or a training query having a second purchasing intention label,
wherein the first purchasing intention label identifies a pre-determined purchasing intent for the training web page and the second purchasing intention label identifies a pre-determined purchasing intent for the training query,
wherein the training web page is a web page publicly accessible via the Internet,
wherein the training query is an Internet search query,
wherein purchasing intent is a degree of interest, while viewing a web page or conducting a query, that a user has in purchasing one or more products or services related to the web page or query, and
wherein purchasing intent is classified as one of: purchase, informational, or non-purchase, purchase indicating the user has a strong interest in purchasing a product related to the web page or query, informational indicating the user has moderate interest in purchasing and/or is researching, and non-purchase indicating the user has low or no interest in purchasing,
upon receiving a training web page, extracts one or more purchasing intent indicators from the training web page, purchasing intent indicators comprising web page content, keyword patterns, web page feature positions, links, and web page layout,
upon receiving a training query, inputs the training query to a search engine, receives a search results web page from the search engine including Internet web page links, each link having an associated Internet web page, and extracts one or more purchasing intent indicators from the search results web page and a plurality of the associated Internet web pages, and
trains a purchasing intent model by applying a machine learning algorithm based on at least one of:
the purchasing intent indicators extracted from the training web page and the first purchasing intention label, or
the purchasing intent indicators extracted from the search results web page of the training query or from the associated Internet web pages and the second purchasing intention label,
wherein when a training query is received, the purchasing intent model determines a purchasing intent for the search results web page and the plurality of the associated Internet web pages and determines combine coefficients for combining the purchasing intent of the search results web page and each of the plurality of Internet web pages such that the combination of purchasing intents corresponds to the pre-determined purchasing intent identified in the second purchasing intention label;

an intake component that receives at least one of user Internet search query information or user Internet web page browsing information; and a classifier component that:
upon receiving user Internet search query information, inputs the user Internet search query information to a search engine, receives a search results web page from the search engine including Internet web page links, each link having at least one associated Internet web page, and extracts at least one purchasing intent indicator from the search results web page and a plurality of the associated Internet web pages,
upon receiving user Internet web page browsing information, extracts at least one purchasing intent indicator from the user Internet web page browsing information, and
determines a purchasing intent for the received at least one of user Internet search query information or user Internet web page browsing information by providing the extracted purchasing intent indicators to the trained purchasing intent model, wherein when purchasing intent for received user Internet search query information is determined, a purchasing intent for the search results web page and the plurality of associated Internet web pages are determined, and the purchasing intent of the search results web page and each of the plurality of Internet web pages are combined according to the combine coefficients determined by the purchasing intent model to determine the purchasing intent for the received user Internet search query.

2. The media of claim 1, wherein the intake component receives at least one user Internet search query.

3. The media of claim 1, wherein the classifier component employs machine learning to determine purchasing intent.

4. The media of claim 1, wherein the system is employed by a search engine to rank search results based on purchasing intent.

5. One or more non-transitory, tangible computer storage media storing computer-executable instructions for performing a method for determining purchasing intent from network-based information, the method comprising:

obtaining at least one of a training web page having a first purchasing intention label or a training query having a second purchasing intention label,
  wherein the first purchasing intention label identifies a pre-determined purchasing intent for the training web page and the second purchasing intention label identifies a pre-determined purchasing intent for the training query,
  wherein the training web page is a web page publicly accessible via the Internet,
  wherein the training query is an Internet search query,
  wherein purchasing intent is a degree of interest, while viewing a web page or conducting a query, that a user has in purchasing one or more products or services related to the web page or query, and
  wherein purchasing intent is classified as one of: purchase, informational, or non-purchase, purchase indicating the user has a strong interest in purchasing a product related to the web page or query, informational indicating the user has moderate interest in purchasing and/or is researching, and non-purchase indicating the user has low or no interest in purchasing;

upon obtaining a training web page, extracting one or more purchasing intent indicators from the training web page, purchasing intent indicators comprising web page content, keyword patterns, web page feature positions, links, and web page layout;

upon receiving a training query, submitting the training query to a search engine, receiving a search results web page from the search engine including Internet web page links, each link having an associated Internet web page, and extracting one or more purchasing intent indicators from the search results web page and a plurality of the associated Internet web pages;

training a purchasing intent model by applying a machine learning algorithm based on at least one of:
  the purchasing intent indicators extracted from the training web page and the first purchasing intention label, or
  the purchasing intent indicators extracted from the search results web page of the training query or from the associated Internet web pages and the second purchasing intention label,
  wherein when a training query is received, determining a purchasing intent for the search results web page and the plurality of associated Internet web pages and determining combine coefficients for combining the purchasing intent of the search results web page and each of the plurality of Internet web pages such that the combination of purchasing intents corresponds to the pre-determined purchasing intent identified in the second purchasing intention label;

receiving at least one of user Internet search query information or user Internet web page browsing information;

upon receiving user Internet search query information, submitting the user Internet search query information to a search engine, receiving a search results web page from the search engine including Internet web page links, each link having at least one associated Internet web page, and extracting one or more purchasing intent indicators from the search results web page and a plurality of the associated Internet web pages;

upon receiving user Internet web page browsing information, extracting at least one purchasing intent indicator from the user Internet web page browsing information; and determining a purchasing intent for the received at least one of user Internet search query information or user Internet web page browsing information by providing the extracted purchasing intent indicators to the trained purchasing intent model,
  wherein determining purchasing intent for received user Internet search query information comprises determining a purchasing intent for the search results web page and the plurality of the associated Internet web pages and combining the purchasing intent of the search results web page and each of the plurality of Internet web pages according to the combine coefficients determined by the purchasing intent model to determine the purchasing intent for the received user Internet search query.

6. The media of claim 5, further comprising automatically classifying Internet web pages according to purchasing intent.

7. The media of claim 5, wherein the purchasing intent for received user Internet search query information is determined using a machine learning algorithm.

8. The media of claim 5, wherein determination of purchasing intent for received user Internet search query information is done automatically.

9. The media of claim 5, wherein the method is employed in an advertising sales method.

10. One or more non-transitory, tangible computer storage media storing computer-executable instructions for performing a method for determining user purchasing intent, the method comprising:

obtaining a training web page having a first purchasing intention label to train a purchasing intent model, the training web page being a web page publicly accessible via the Internet,
  wherein the first purchasing intention label identifies a pre-determined purchasing intent for the training web page,
  wherein purchasing intent is a degree of interest, while viewing a web page or conducting a query, that a user has in purchasing one or more products or services related to the web page or query, and
  wherein purchasing intent is classified as one of: purchase, informational, or non-purchase, purchase indicating the user has a strong interest in purchasing a product related to the web page or query, informational indicating the user has moderate interest in purchasing and/or is researching, and non-purchase indicating the user has low or no interest in purchasing;

obtaining a training query having a second purchasing intention label to train the purchasing intent model, the training query being an Internet search query, wherein the second purchasing intention label identifies a pre-determined purchasing intent for the training query;

extracting one or more purchasing intent indicators training web page, purchasing intent indicators comprising web page content, keyword patterns, web page feature positions, links, and web page layout;

processing the training query by entering the training query into a search engine that returns a search results web page including a list of a top N query result links, each of the top N query result links having an associated Internet web page, where N is an integer from one to infinity;

extracting one or more purchasing intent indicators from the search results web page and each of the Internet web pages associated with the top N query result links;

training the purchasing intent model by applying a machine learning algorithm based on the purchasing intent indicators extracted from the training web page along with the pre-determined purchasing intent identified in the first purchasing intention label as well as the purchasing intent indicators extracted from the search results web page and extracted from each of the Internet web pages associated with the top N query result links along with the pre-determined purchasing intent identified in the second purchasing intention label, wherein combine coefficients for combining the purchasing intent of the search results web page and each of the Internet web pages associated with the top N query result links are determined such that a combined purchasing intent corresponds to the second known purchasing intent;

constructing a purchasing intent classifier based on the trained purchasing intent model;

obtaining user Internet web page browsing information from a network for purchasing intent classification;

extracting at least one purchasing intent indicator from the user Internet web page browsing information;

using the purchasing intent classifier, determining a purchasing intent for the user Internet web page browsing information based on the at least one extracted purchasing intent indicator;

obtaining user Internet search query information for purchasing intent classification;

processing the user Internet search query information by entering the search query into a search engine that returns a search results web page including a list of a top P query result links, each of the top P query result links having an associated Internet web page, where P is an integer from one to infinity;

extracting one or more purchasing intent indicators from the search results web page and from each of the Internet web pages associated with the top P query results;

determining a purchasing intent for the search results web page and each of the Internet web pages associated with the top P query results using the intent classifier;

determining a purchasing intent for the user Internet search query by combining the purchasing intent of the search results web page and the purchasing intent of each of the Internet web pages associated with the top P query results using the combine coefficients determined by the purchasing intent training model; and determining a complete user purchasing intent based on the determined purchasing intent of the user Internet web page browsing information and the determined purchasing intent of the user Internet search query information.

11. The media of claim 1, wherein the system is implemented on at least one of a computer, a server, or a handheld electronic device.

\* \* \* \* \*